United States Patent
Sevigny

(10) Patent No.: US 9,772,878 B2
(45) Date of Patent: Sep. 26, 2017

(54) DETERMINING A JOB GROUP STATUS BASED ON A RELATIONSHIP BETWEEN A GENERATION COUNTER VALUE AND A TICKET VALUE FOR SCHEDULING THE JOB GROUP FOR EXECUTION

(71) Applicant: Unity IPR ApS, Copenhagen K (DK)

(72) Inventor: Benoit Sevigny, Montréal (CA)

(73) Assignee: Unity IPR ApS, Copenhagen K (DK)

( * ) Notice: Subject to any disclaimer, the term of this patent is extended or adjusted under 35 U.S.C. 154(b) by 0 days.

(21) Appl. No.: 15/192,309

(22) Filed: Jun. 24, 2016

(65) Prior Publication Data

US 2017/0132037 A1    May 11, 2017

Related U.S. Application Data

(60) Provisional application No. 62/252,897, filed on Nov. 9, 2015.

(51) Int. Cl.
  *G06F 9/48* (2006.01)
  *G06F 9/50* (2006.01)

(52) U.S. Cl.
  CPC .......... *G06F 9/4881* (2013.01); *G06F 9/5044* (2013.01)

(58) Field of Classification Search
  CPC ............................. G06F 9/4881; G06F 9/5044
  See application file for complete search history.

(56) References Cited

U.S. PATENT DOCUMENTS

| | | | | |
|---|---|---|---|---|
| 2008/0271042 A1* | 10/2008 | Musuvathi | .......... | G06F 11/3688 718/108 |
| 2010/0318995 A1* | 12/2010 | Messmer | .............. | G06F 9/4881 718/102 |
| 2012/0079490 A1* | 3/2012 | Bond | .................... | G06F 9/5038 718/103 |
| 2012/0304178 A1* | 11/2012 | Grove | ..................... | G06F 9/522 718/102 |
| 2015/0135183 A1* | 5/2015 | Kipp | ......................... | G06F 9/46 718/103 |
| 2016/0154677 A1* | 6/2016 | Barik | .................. | G06F 13/4239 718/105 |

* cited by examiner

*Primary Examiner* — Meng An
*Assistant Examiner* — Jorge A Chu Joy-Davila
(74) *Attorney, Agent, or Firm* — Schwegman Lundberg & Woessner, P.A.

(57) ABSTRACT

A job scheduler system includes one or more hardware processors, a memory including a job group queue stored in the memory, and a job scheduler engine configured to create a first job group in the job group queue, the first job group includes a generation counter having an initial value, receive a first request to steal the first job group, determine a state of the first job group based at least in part on the generation counter, the state indicating that the first job group is available to steal, based on the determining the state of the first job group, atomically increment the generation counter, thereby making the first job group unavailable for stealing, and alter an execution order of the first job group ahead of at least one other job group in the job group queue.

20 Claims, 14 Drawing Sheets

US 9,772,878 B2

DETERMINING A JOB GROUP STATUS BASED ON A RELATIONSHIP BETWEEN A GENERATION COUNTER VALUE AND A TICKET VALUE FOR SCHEDULING THE JOB GROUP FOR EXECUTION

CROSS-REFERENCE TO RELATED APPLICATIONS

This application claims the benefit of priority to U.S. Provisional Patent Application Ser. No. 62/252,897, filed Nov. 9, 2015, herein incorporated by reference in its entirety.

TECHNICAL FIELD

The present disclosure relates to the field of computer operating systems and, more specifically, to job schedulers.

BACKGROUND

In computer operating systems and related software, a job scheduler (or "process scheduler") is an application that manages the distribution of work (e.g., in the form of jobs or processes) to different computing resources (e.g., processor cores). Current job schedulers have a performance loss when using multiple core systems. The loss of performance may be due to the use of operating system locks (e.g., mutexes), which are used to manage multiple cores accessing common data structures (e.g., concurrent data structures) and which put waiting threads to sleep. One such data structure is a job queue, which has producers of jobs (e.g., usually applications) on the input side and consumers of jobs (e.g., processor cores) on the output side of the queue. Inefficiencies can occur when multiple entities (e.g., multiple processors, processor cores, applications, or threads) try to simultaneously modify the shared queue data structure (e.g., because the locks only allow one entity to read/write to the structure at the same time, while all other entities must wait for access).

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The following description and drawings are illustrative of the disclosure and are not to be construed as limiting the disclosure. Numerous specific details are described to provide a thorough understanding of the present disclosure. However, in certain instances, details well known to those in the art are not described in order to avoid obscuring the description of the present disclosure.

Some operating systems use memory locking to prevent simultaneous access to a shared memory location (e.g., a data structure such as a job queue). An operating system memory lock (or just "lock"), such as a mutex or a semaphore, is a synchronization mechanism that may be used to manage access to the shared memory location for multiple actors (e.g., multiple threads of execution that each use the shared memory location). For example, a lock may be given by the operating system (OS) to an application thread (referred to herein simply as a thread) so that the thread can have exclusive access to the shared memory location (e.g., the data structure) until the thread is done using that memory location. Other threads that need access to this memory location may be denied access until the location is unlocked. Conventional lock-based systems incur performance loss since threads (e.g., processes, or applications) must wait and are often put to sleep until the memory location is unlocked in order to complete their work.

In accordance with an embodiment, a job scheduler system and method is described herein. The job scheduler system uses wait-free concurrent data structures along with atomic memory transactions to avoid or otherwise mitigate synchronization issues that cause inefficient processor activities such as waiting for memory locations to become unlocked (e.g., using thread sleeping). Sleeping a process is relatively slow (e.g., on the order of milliseconds) as compared to atomic locks (e.g., on the order of a number of CPU cycles). The data structures include a job queue, an execution stack, and a job list stack. These data structures and associated atomic memory transactions described herein can render the processing of jobs more efficient, thereby improving the functioning of the computer itself.

Figure 1:
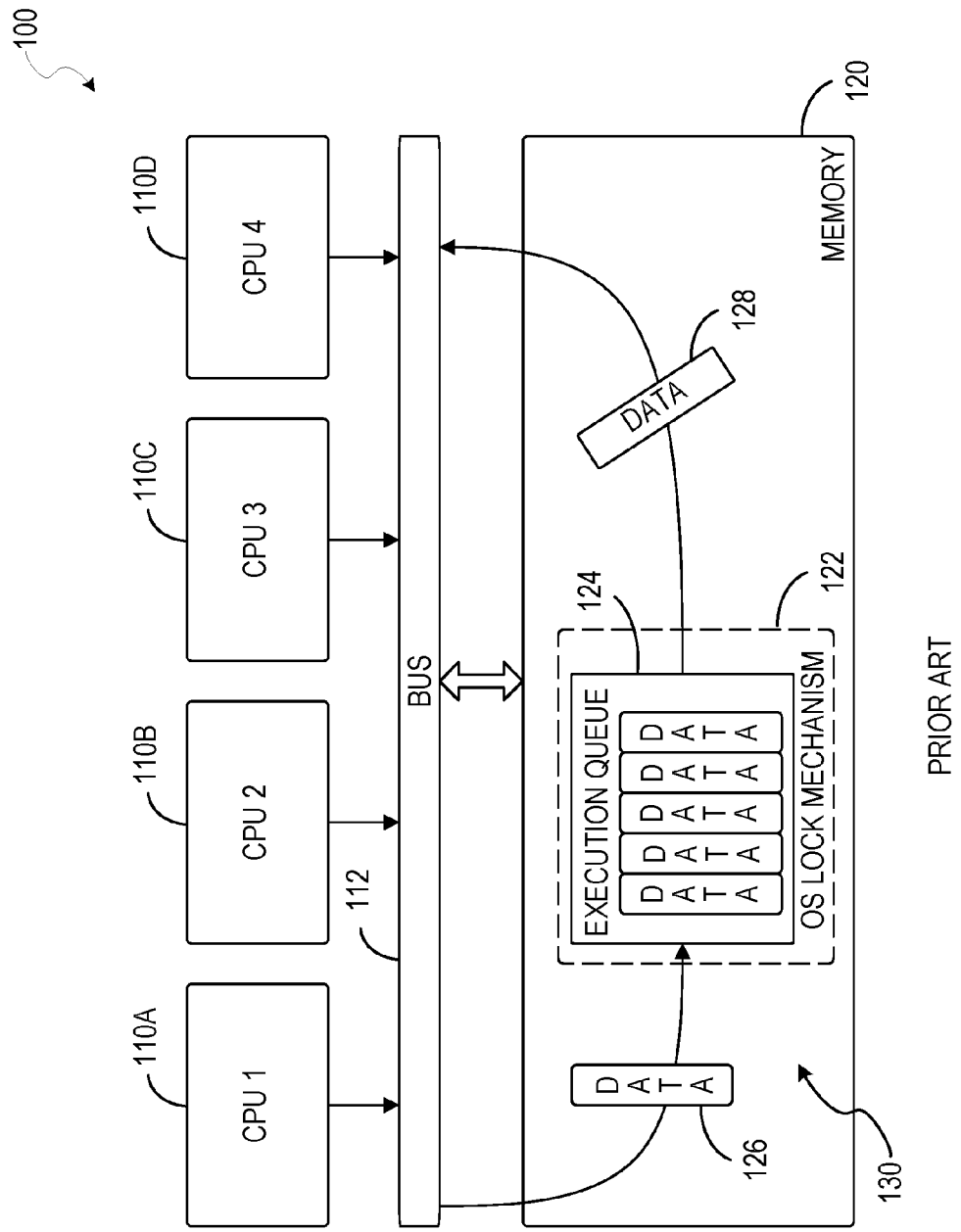
FIG. 1 is a block diagram illustrating a conventional computing device in which a conventional job scheduler implements software memory locks.

FIG. 1 is a block diagram illustrating a conventional computing device 100 in which a conventional job scheduler 130 implements conventional operating system memory locking for portions of a memory 120 (e.g., including a data structure). The job scheduler 130 employs conventional software memory locks (e.g., mutexes), for example, to manage access by processors to a common memory location, such as an execution queue 124 stored in the memory 120. The job scheduler 130 is identified herein by the data structure(s) used by the job scheduler for purposes of convenience, and is not otherwise separately identified.

The computing device 100 includes multiple central processing units (CPUs) 110A, 110B, 110C, 110D (collectively, CPUs 110) (e.g., each having a single "core"). In other embodiments, the CPUs 110 may contain multiple cores, where each core may be thought of as a distinct CPU 110 for purposes of this disclosure. A communications bus 112 (e.g., a front-side bus, a back-side bus) communicatively couples the CPUs 110 to a memory 120 (e.g., random access memory (RAM) or cache memory).

During operation, job data 126 for a job (e.g., a running process) or a group of jobs from one of the CPUs 110 is added to an execution queue 124 to await execution. Threads from the CPUs 110 extract job data 128 from the queue 124 for execution. Worker cores of the CPUs 110 execute jobs sequentially off the end of the queue 124 until all the jobs on the queue 124 are complete (e.g., until the queue 124 is empty). With a conventional lock system ("OS Lock Mechanism") 122, a thread needing a particular job in the queue 124 has to wait until that job comes to the end of the queue 124 before dequeuing it. The memory locks force CPUs 110 (and cores and threads) to wait for jobs to clear the execution queue 124. For example, a thread may require a value from a computation from a job within the queue 124, but that thread would have to wait for that computation to be pushed off the queue 124 and executed in a core in order to access the value of the computation returned from the core. In addition, conventional lock systems 122 may use locks that lock the entire queue data structure such that only one thread may have access at any given time and other threads may be forced to sleep while waiting.

Operating systems often use conventional job schedulers, such as the job scheduler 130, which are capable of operating with jobs that do not explicitly expose dependencies because the OS should be compatible with applications that do not express dependencies for the jobs they send to the queue. These operating systems implement schedulers that attempt to mitigate dependencies using various known methodologies. These methodologies may be suitable for less-time-sensitive applications that have many large jobs. However, some software applications such as, for example, a game engine, may need to handle many small jobs which are time-sensitive (e.g., because the user is often waiting for a game to respond to their input). Conventional job schedulers may make working with many small, time-sensitive jobs less efficient because the latency of unlocking and waking (e.g., from sleeping) a thread can be much larger than the execution of the jobs within the thread. For example, the latency of unlocking a lock is many thousands of CPU cycles. As such, considerable processing power may be lost due to the lock based scheduling system, particularly when working with many small, time-sensitive jobs.

The job scheduler systems and methods described herein uses atomic memory transactions to reduce the number of required cycles to start the execution of a thread (e.g., to a few hundred cycles) and avoid at least some of the above identified technical problems with conventional job schedulers that employ waiting locks, thereby improving the functioning of the computer itself. For example, in some embodiments, all steps are done atomically, and the only waiting lock employed is a semaphore on which threads wait when there is no more work to do (e.g., when all data structures are empty). Unlike conventional schedulers that use conventional system locks, the systems and methods described herein allow threads to read/write to data structures at the same time (except for a few cycles during atomic operations).

Some known job schedulers use a method known as Earliest Deadline First (EDF). Under conventional EDF, the job scheduler has deadlines associated with jobs (e.g., when the result of each job will be needed). However, under some operational conditions such as with gaming engines, the gaming engine may be controlled by a user script such that the ordering of jobs is unpredictable and can change dramatically (e.g., from frame to frame, depending on behavior of the script). Known EDF schedulers are poorly equipped to handle such situations. The job scheduler and methods described herein are designed such that the order of evaluation is under the control of the user (e.g., the developer, or a game player). This enables the job scheduler to adapt itself dynamically (e.g., using job stealing).

Further, some known job schedulers use conventional Priority Queues (e.g., to alter when some jobs get executed over other jobs). One problem with conventional Priority Queues is that, when changing the priority of jobs, the job scheduler may need to lock the whole system (e.g., bringing everything to a stop) while reorganizing the queue and then starting threads over. The job scheduler and methods described herein may dynamically change the priorities (e.g., based on data usage) without having to freeze everything while maintaining the data structure.

Figure 2:
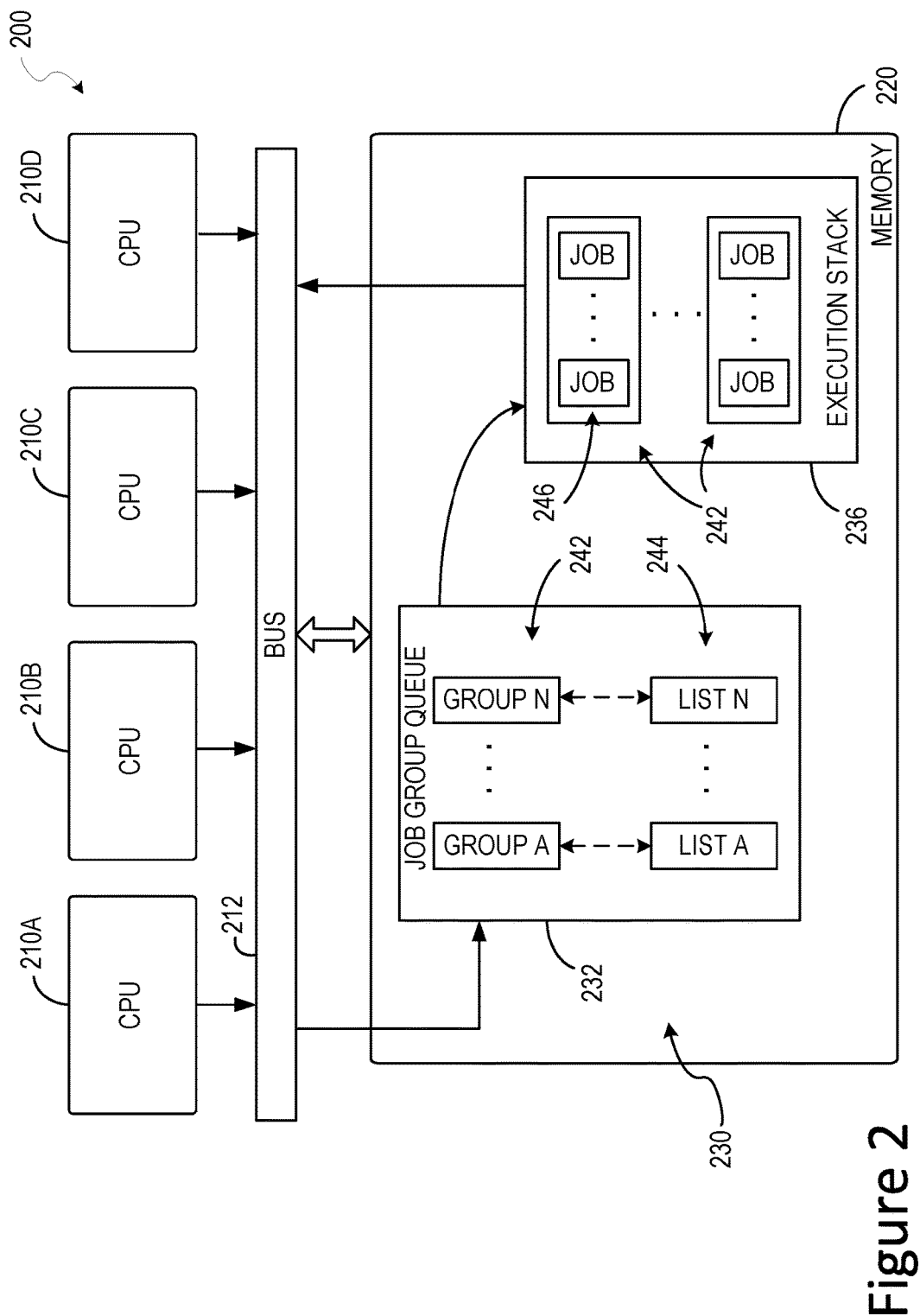
FIG. 2 is a diagram of an example computing device that includes a job scheduler system (or just "job scheduler") as described herein.

FIG. 2 is a diagram of an example computing device 200 that includes a job scheduler system (or just "job scheduler") 230 as described herein. The computing device 200 includes multiple CPUs 210A, 210B, 210C, and 210D (collectively, "CPUs 210") communicatively coupled to a memory 220 by a communications bus 212. The CPUs 210 may be similar to the CPUs 110, the bus 212 may be similar to the bus 112, and the memory 220 may be similar to the memory 120.

The job scheduler 230 includes several data structures stored and maintained in the memory 220, including a job group queue 232, an execution stack 236, and a counter system (not shown). For purposes of convenience, the job scheduler 230 is identified herein by the collection of data structures used by the job scheduler (e.g., the job group queue 232 and the execution stack 236), and is not otherwise separately identified. It should be understood that the job scheduler 230 may also include other logical and physical components such as to enable the systems and methods described herein, which may include, but are not limited to, a separate processor or memory area, and a process or thread that periodically executes on one or more of the CPUs 210.

The job group queue 232 may include one or more job groups (or just "groups") 242, such as "Group A" through "Group N". Each group 242 includes an associated job list 244, where each job list 244 identifies one or more jobs 246 of the associated group 242. The execution stack (or just "stack") 236 includes jobs from one or more of the groups 242 (e.g., the jobs 246 from the job lists 244 associated with each group 242, with each group 242 having one or more jobs 246).

In the example embodiment, the scheduling system 230 is implemented as a state machine, wherein the scheduling system 230 is in only one state at a time and can transition between a finite number of states. In the example embodiment, the job scheduler 230 implements a wait-free (e.g., without traditional system locks that generate waiting processes) job stealing mechanism wherein a client (e.g., processor, game engine, application, thread, and so forth) can 'steal' jobs (e.g., job groups) from the queue 232. The stolen job group 242 bypasses other jobs (e.g., other job groups 242) ahead of it in the queue 232, directly placing them on the execution stack 236 ahead of the jobs in the other job groups 242. Further, the job scheduler 230 may also resolve dependencies of the stolen job group (e.g., stealing another job group 242 upon which the initial stolen job group 242 is dependent).

The term "stealing," as used herein, refers to reordering of a job or job group (e.g., the stolen job group) on a queue (e.g., changing the position of the stolen job group on the queue). In the example embodiment, stolen job groups are moved to the front of a job group queue (e.g., in front of any other pending job groups) and/or placed directly onto an execution stack (e.g., preparing the jobs for execution). Stealing, as described herein, differs from priority queues in multiple ways. For example, in some known priority queues, each job has a priority setting (e.g., often an integer), and the priority setting is used to identify a relative importance of the job to other jobs in the queue. When a job is picked to run off of the queue, the relative priority settings of all of the jobs on the queue may influence which job gets selected (e.g., the job with the highest priority setting on the queue may be selected). In contrast, stealing identifies a particular job and moves (e.g., reorders) that job within the queue immediately (e.g., initially regardless of any relative importance of the stolen job group to other job groups). Further, the stealing methods described herein enable the developer to in effect preempt the execution order of the stolen job group over all others currently on the queue. In contrast, under priority queues, the developer may change the priority setting, but this does not necessarily ensure that the prioritized job group moves immediately to the front of the queue (e.g., there may still be other jobs with higher priorities on the queue, or other jobs with the same priority that are ahead of the prioritized job in the queue).

In the example embodiment, the job scheduler 230 is lock-free (e.g., wait-free) in certain respects. In other words, the job scheduler 230 performs certain steps atomically, without the use of conventional waiting locks (e.g., locks, such as a semaphore, which block the execution of a thread requesting the lock until it is allowed access to the locked memory, usually by putting the thread to sleep). Particular operations are described herein as being executed atomically, such as incrementing and decrementing of certain counters associated with job stealing. This particular performance of steps atomically, as described herein, allows the job scheduler 230 to avoid use of waiting locks as they are commonly used by some conventional job schedulers. As such, during operation, threads are allowed concurrent access to key data structures (e.g., the job group queue 232).

Jobs from a client (e.g., a CPU 210, a game engine, an application, or the like) are typically packaged into groups (e.g., groups 242) prior to being sent to the job scheduler 230. Groups 242 are formed by packaging together multiple jobs (e.g., jobs 246 of the list 244) that can run concurrently in any order (e.g., they have no dependencies with each other). Job groups 242 include a header and memory, including a job list structure (e.g., the associated list 244). Each group 242 can be recycled using the header and memory location (e.g., referring to the act of reusing the same header and memory for a second set of jobs after a first set of jobs is finished executing). Recycling a job group 242 improves the efficiency of the job scheduler 230 since the creation (e.g., memory allocation) of a new job group would require an OS system call, and would incur an associated latency.

In some embodiments, the client can also add information (e.g., metadata) regarding any explicit dependencies for the packaged job group 242 (referred to herein as "dependent job group"). The dependencies for a particular job within a group specify which other job or jobs external to the group must be completed before the particular job can be executed (referred to herein as "dependency job" or "dependency job group"). In the example embodiment, each job group 242 may specify a single job- or job group-dependency (e.g., one-to-one, in which one job 246 or job group 242 must be executed before the referring group 242). Multiple groups 242 may depend on the same group 242 (e.g., many-to-one). In other embodiments, each job group 242 may specify multiple dependencies (e.g., one-to-many). The term "dependent job group" is used herein to refer to a job group that is dependent upon another job or job group. The term "dependency job" or "dependency group" is used herein to refer to the job or job group upon which a dependent job group depends.

When a job group 242 is received by the job scheduler 230, it is placed in the job group queue 232. The queue 232 is a first in/first out (FIFO) style queuing data structure and algorithm (e.g., illustrated from left to right in FIG. 2), although this queuing algorithm is modified as described herein (e.g., with stealing). The job scheduler 230 removes job groups 242 from the output side of the queue and resolves any dependencies before placing the jobs (e.g., from the associated job list 244) on the execution stack 236. The stack 236 is a last in/first out (LIFO) style data structure and algorithm, optionally modified as described herein. Jobs 246 are taken off the stack and executed by a processor 210, after which they are marked as finished.

The counter system is used to help track the state of jobs 246, including states such as queued, holding, stacked, executing, and finished. In some embodiments, the job scheduler 230 may use an atomic primitive called "compare-and-exchange," a memory transaction that will only update memory if the content has a specific value. This atomic primitive is subject to an issue distinguishing between equal values being stored at different times (e.g., the memory location starts with a first value written by a first thread, has the first value changed to a second value by a second thread, and then has the second value changed back to the first value by the second thread, which fools the first thread into thinking that nothing has changed when the first thread does the comparison—a problem known as the ABA problem in multithreading). To improve reliability, the job scheduler 230 uses counters on critical memory locations to distinguish between equal values being stored at different times by different threads. For example, when a critical memory location is successfully written to, the counter for that location is incremented to indicate the successful memory write. The counters may be used, for example, to help determine the state of a job and distinguish between equal values being stored at different times (e.g., the equal values would have different counter values).

In the example embodiment, each job group 242 includes at least two associated counters (not separately shown). A first counter is referred to herein as a "generation counter," storing a numerical value referred to herein as a "generation count." A second counter is referred to herein as a "job counter," storing a numerical value referred to herein as a "job count." The generation counter is used to track the state of the associated job group, and to help identify when the job group has been dequeued or stolen, is on the stack 236 or is waiting to get on the stack 236, is executing, or is finished executing. The numerical value of the generation counter and/or whether the generation counter is even or odd may be used to distinguish between some of these different states. Once the job group has been dequeued and put on the stack, the job counter is used to track the number of jobs for the job group that remain on the stack (e.g., not yet executed).

When a job group container is first created (e.g., when memory is allocated for the container), the initial generation counter is set at an even number (the "starting generation count"). The exact numerical value of the starting generation count can be any arbitrary integer. The job scheduler is then free to place a received job group 242 (e.g., received from an application that wants the job group 242 to be executed) in the container and place the container on the job group queue 232. The job scheduler 230 creates and transmits a ticket to the application that submitted the job group 242. The ticket includes the memory location of the job group 242 (e.g., the memory location of the container for the job group 242) and a "ticket value" at which the group will be considered finished (also referred to herein as the "finished generation count"). The finished generation count for a group may be, for example, the starting generation count+2. The ticket and the generation count are used to track the state of the job group 242 as it passes through the job scheduler 230.

The state of a job group 242 and the value of the generation counter for that job group 242 may be linked to the ticket value for that job group. More specifically, when the generation counter is two less than the ticket value (e.g., generation counter=ticket value−2), then the job group 242 is in the queued state (e.g., the job group 242 is in the job group queue 232). When the generation counter is one less than the ticket value (e.g., generation counter=ticket value−1), then the job group 242 is in the pushed state (e.g., the job group 242 has been dequeued or stolen and it is in one of three places: on the stack, waiting to get on the stack, or being executed by a CPU 210). When the generation counter is equal to the ticket value (e.g., generation counter=ticket value), then the job group 242 is in the finished state (e.g., the job group 242 has left the stack and has been executed by a CPU). Accordingly, since the initial value of the generation counter is even, generation count values that are even numbered refer to job groups that are in the queue or finished executing, and generation count values that are odd numbered refer to job groups whose jobs are being executed, are in the stack, or are waiting to get onto the stack 236.

Some known job schedulers have memory leak issues brought on by jobs that are scheduled but are never properly executed. The memory for these unexecuted jobs is never deallocated, and thus the amount of memory leaked can increase over time. These job schedulers must track pending jobs in order to avoid such memory leak issues. Here, the job scheduler 230 avoids or reduces such issues by reusing memory for jobs that come off the queue and are not properly executed. As such, the job scheduler 230 may not need to track job groups. If a job group 242 is incompletely executed, the scheduling system 230 may wait on it or, since job group containers are reused, a job group may be scheduled and then forgotten (e.g., not tracked).

In the example embodiment, there are several actions taken by the job scheduler 230 that include changing (e.g., incrementing) the generation counter. During a life cycle of the job group 242 container, the generation counter is incremented twice. First, it is incremented by one when the job group 242 is dequeued or stolen. Second, it is incremented by one when the job group 242 has completed execution. As such, when a job group container is recycled, the generation count for that container has been incremented by two each time (e.g., returning to an even value to start another cycle of use).

More specifically, when a job group is dequeued or stolen, the generation count is incremented by one to indicate that the associated job list 244 has been or will be put on the execution stack 236 (e.g., the generation count becomes odd after being dequeued or stolen, being used as a toggle switch). Only one thread will successfully steal or dequeue a job group 242 (e.g., the first thread to steal or dequeue it). Other threads may fail at dequeuing and stealing this job group 242 because they may detect that the generation count is not the expected value for a job group in the queue 232, signaling that the job group 242 is no longer in the queue 232 (e.g., because it has already been dequeued or stolen). A job group 242 may only be stolen or dequeued if it is in the queue 232 and, accordingly, the expected generation count for dequeuing or stealing a job group may be the final generation count−2. If the generation count is not the ticket value−2, then another thread must have already dequeued or stolen the job group 242 and incremented the generation counter (e.g., so that the generation count may be the ticket value−1). An odd value of the generation counter also signals that the job group 242 has already been removed from the queue because of stealing or dequeuing and, accordingly, an odd value of the generation counter blocks a second thread from dequeing or stealing the job group 242.

When a job group 242 has cleared the stack 236 and all of the jobs from the job group 242 have been completely executed, the job scheduler 230 increments the generation counter of that job group 242 by one (e.g., making the generation count even again). As such, the generation count has been incremented by two since the job group was put on the queue (e.g., once when dequeued/stolen, and again when the group is finished). When the group 242 is finished, the generation count is equal to the ticket value of the group 242, and any thread waiting on this particular group 242 (e.g., a dependent job group) will see the job group 242 as finished (e.g., by checking the generation count). As soon as a job group 242 is finished, any dependent jobs for that finished group 242 that were set to be rescheduled (e.g., held waiting to get on the stack 236 or put back on the queue 232 to be processed later) may then be safely placed on the stack 236.

When an application thread needs the result from a specific job group with high priority, the thread issues a 'wait' on the specific job group, indicating that the result is required as soon as possible. If a wait is issued for a specific job group 242, then the job scheduler 230 first checks the state of the job group 242 by comparing the generation count for the job group 242 with the ticket value for the same job group 242. If the ticket value and the generation count are equal, then the job group 242 is finished, and the thread will take the output value of the executed job and return to the application that spawned the thread. If the ticket value is one greater than the generation count (e.g., the generation count is odd), then the job list 244 of the job group 242 is either on the execution stack 236 or waiting to be put on the stack 236 (e.g., "pushed"), or is currently being executed, and the job scheduler 230 may pick jobs from the stack 236 and execute them until the generation count of that job group 242 indicates that all of the jobs in the job list 244 for the job group 242 are finished and the thread will take the output value of the executed job and return to the application that spawned the thread. If the generation count is two less than the ticket value (e.g., the generation count is even and not equal to the ticket value), then the job group 242 is still in the queue, and the job scheduler 230 may go through the entire stealing and dependency resolving process for that job group 242 first, then pick jobs to execute from the execution stack until the generation count of the job group 242 indicates that it is finished.

The job counter for the job group 242 keeps track of the number of completed jobs within the group 242 (e.g., the associated job list 244). Each job group 242 includes one or more jobs for execution, and the job counter is used to determine when the last job is executed for the group 242. The job counter is initialized to the number of jobs contained within the job group 242 when the job group 242 is first placed in a container, and gets atomically decremented every time a job that belongs to the group 242 has finished executing. When the job counter gets to zero, the group 242 is finished executing, and the generation counter is atomically incremented to tag the group as finished. Accordingly, after the group 242 is finished, the dependent jobs of that group 242 are added to the execution stack (e.g., if any exist).

In some known lock-free systems, issues may develop with respect to dependency chains. Jobs put on the execution stack can execute concurrently (e.g., many threads can pop jobs and execute then at the same time) and therefore, in some situations, it is not possible for a thread waiting on a specific ticket to execute anything from the stack except for jobs from the current job groups on the stack. As such, those systems can, in some situations, behave as a one core system, with all cores waiting on a single core to do all the work. Accordingly, the job scheduler 230 described herein implements at least the counter system and uses job lists to mitigate these scenarios.

Referring again to FIG. 2, the job lists 244 hold the list of jobs that belong to a group 242 while the group 242 is in the queue 232 (e.g., when not stolen). Additionally, when the group 242 moves to the stack 236 to be executed, the job list 244 holds the list of jobs that are to be rescheduled (e.g., the dependent jobs of the group 242) while the group is executing.

The job scheduler 230 creates, uses, and recycles job lists 244. For example, when the job group 242 is removed from the queue 232 and put on the stack 236 for execution, the associated job list 244 is used to hold secondary job groups (e.g., dependent jobs 246 from dependent job groups 242 that are dependent on the removed job group) from entering the stack while the removed job group executes. Use and recycling of job lists 244 is described in greater detail below. The efficient use of the job lists 244 is made possible by the generation counter (e.g., as a toggle switch). In the example embodiment, the generation counter includes a numerical value (e.g., an integer). As used herein, the term "generation counter" may be used, in some contexts, to refer to the numerical value. For example, when the generation counter for a particular job group 242 is even, the associated job list 244 contains jobs 246 that belong to a first job group (e.g., the removed job group). When the generation counter is odd, the job list 244 contains dependent jobs for that removed job group that will need to be put on the stack 236 when the removed job group 242 is finished executing. The combination of the job list 244 and the generation counter allows the delayed insertion of a set of jobs on the stack 236 on a per-group basis, which allows for dependent jobs to be dealt with in a very efficient way.

The job scheduler 230 may "recycle" the memory regions associated with job groups 242 in the queue 232, job lists 244, and/or job groups 242 in the execution stack 236. The jobs within the job lists 244 go on the stack for execution. A job group 242 (e.g., a job group container) is empty when it is recycled. During operation, memory regions may be allocated and deallocated (e.g., "malloc( )" and "free( )", respectively, in C) by the job scheduler 230 for various purposes (e.g., creating new job groups 242 or job lists 244). As used herein, the term "recycling" refers to the act of maintaining an already-allocated memory region after it has been unassigned (e.g., after a first purpose has been satisfied), then reassigning that memory region to a new purpose. In other words, a "recycled" memory region is not deallocated once its first purpose is satisfied and, thus, recycling avoids calling the operating system for a new memory allocation. For example, when a job group 242 is dequeued, the memory region within the job group queue 232 may be recycled. Instead of deallocating the memory region when the job group is dequeued, the memory region is maintained and tracked by the job scheduler 230. When a new job group 242 enters the queue 232, that already-allocated memory region may be assigned to the new job group. As such, with recycling of memory regions, the job scheduler does not expend the computational resources to deallocate and reallocate memory. Unused job groups are tracked and maintained by the job scheduler 230 in a distinct pool (e.g., a "recycling stack").

In the example embodiment, generation counters persist and stay with their job group containers through recycling. The generation counter is recycled with the recycled container and maintains the same value through recycling (e.g., an even integer equal to the previous group's ending generation count). Accordingly, the starting generation count for a group that is assigned to a recycled group container is whatever number comes through recycling (i.e., the previous group's ending generation count).

To facilitate memory recycling and speed of processing, the job scheduler 230 may implement one or more of the queue 232, the job lists 244, and the stack 236 as linked lists. Linked lists enable the job scheduler 230 to easily add and remove elements from the list dynamically, either with newly allocated memory (e.g., when first creating the job groups 242) or with pre-allocated, recycled memory regions. Memory may be added as needed, but once allocated, the memory is maintained (e.g., not deallocated) and may be recycled to reduce the computational burden for managing the queue 232, job lists 244, and/or the stack 236. Job groups 242, job lists 244, and the stack 236 may be implemented as simple data structures (e.g., using "struct" in C# or C++) containing data, along with a pointer to the next structure, thereby establishing a linked list. For example, a job group 242 may include a pointer to the next job group 242 in the queue 232, and may also include another pointer to the associated job list 244.

During operation, in the example embodiment, when the job scheduler system 230 starts, it creates a number of worker threads (e.g., typically equal to the number of cores) and leaves one core for the main application thread. The worker threads loop in the following way: (1) check if anything can be executed on the stack 236, and if so, execute it; (2) if there is nothing to execute on the stack 236, then check if anything is in the queue 232. If there is, then dequeue the next group 242, resolve the group's dependencies, and check the stack again 236; and (3) if nothing is available on the stack 236 or the queue 232, then the thread goes to sleep. Threads are awoken when new jobs are scheduled.

Figure 3A:
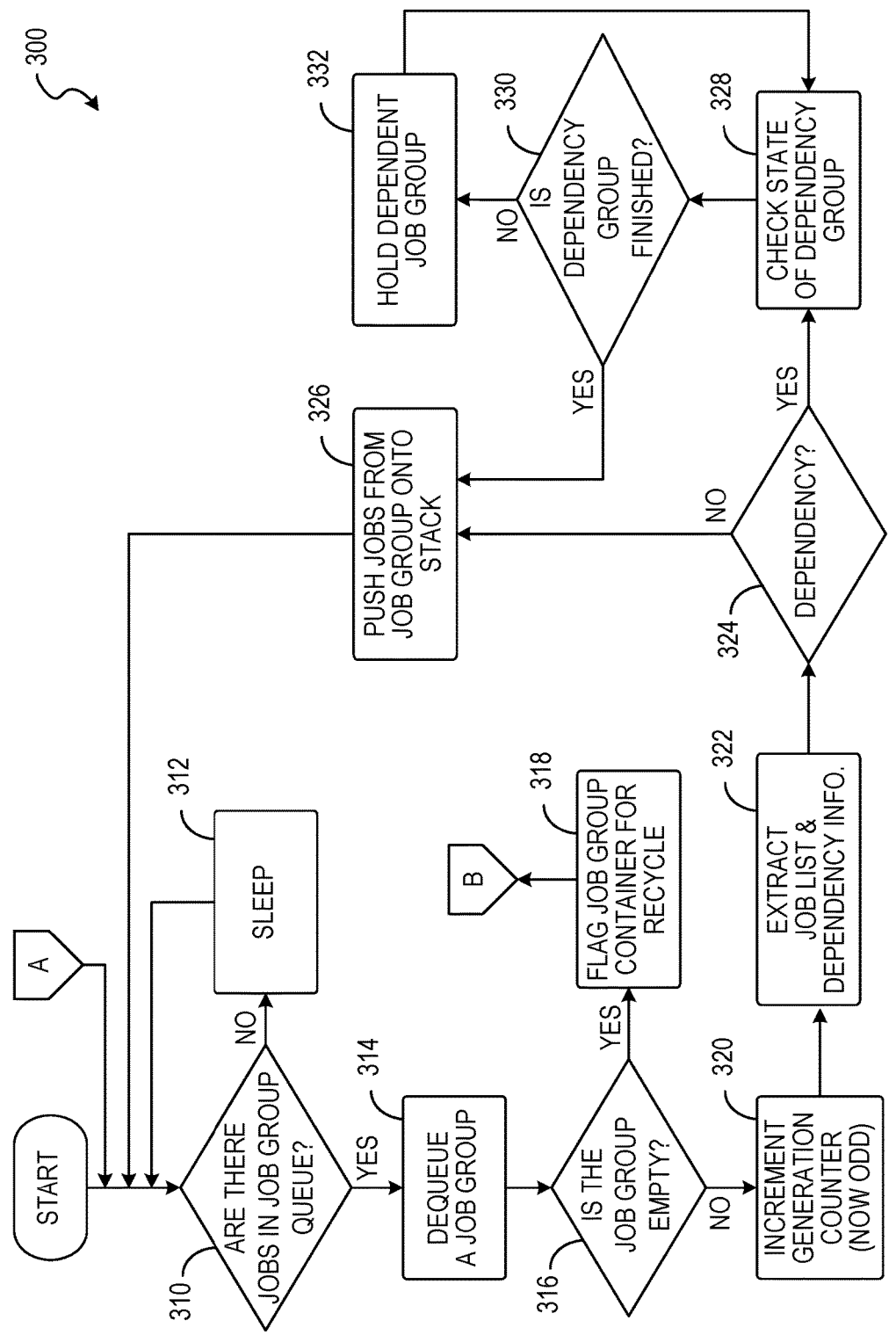
FIG. 3A illustrates operations associated with dequeuing job groups from the job group queue shown in FIG. 2.
Figure 3B:
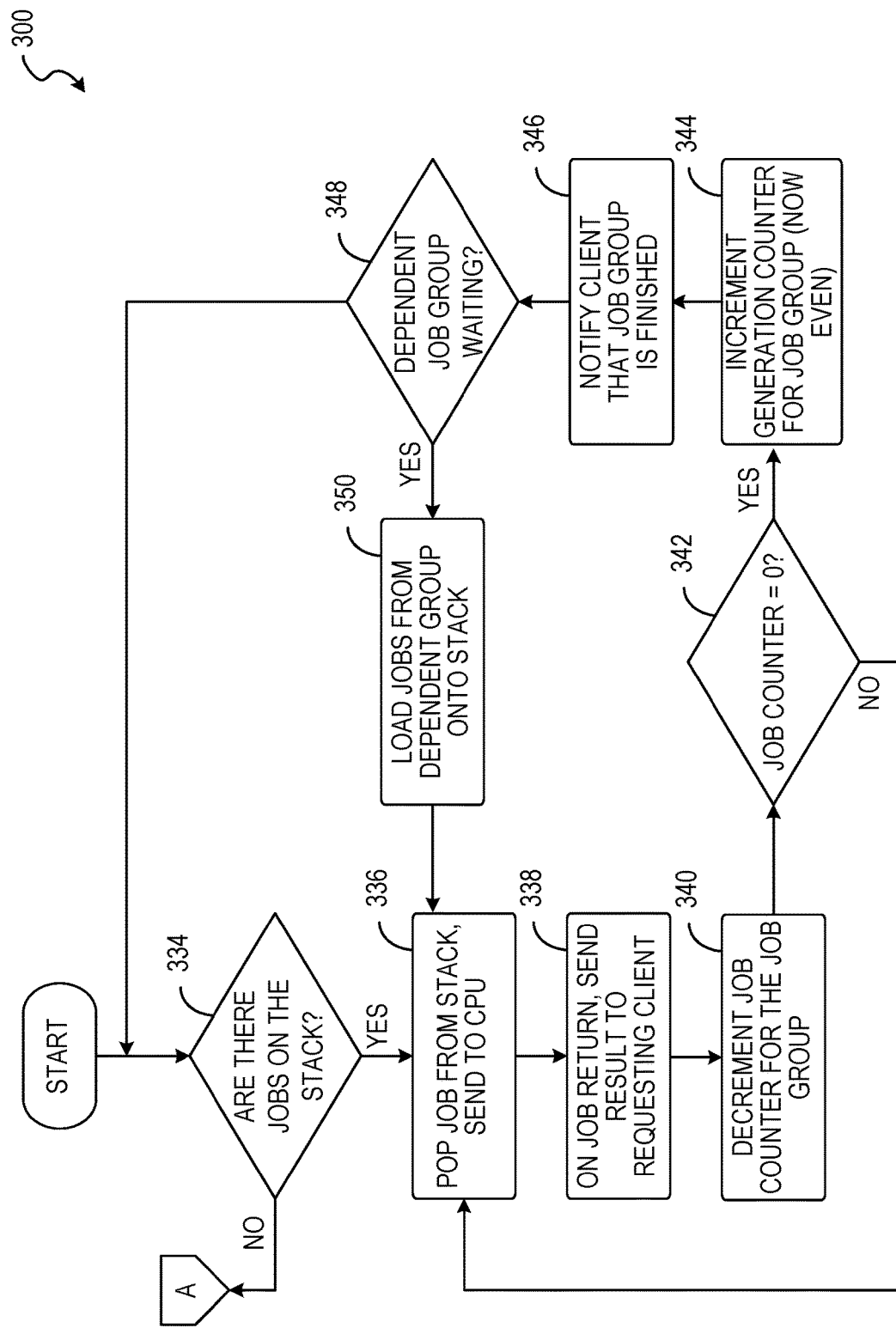
FIG. 3B illustrates operations associated with stack operations associated with the execution stack shown in FIG. 2.
Figure 3C:
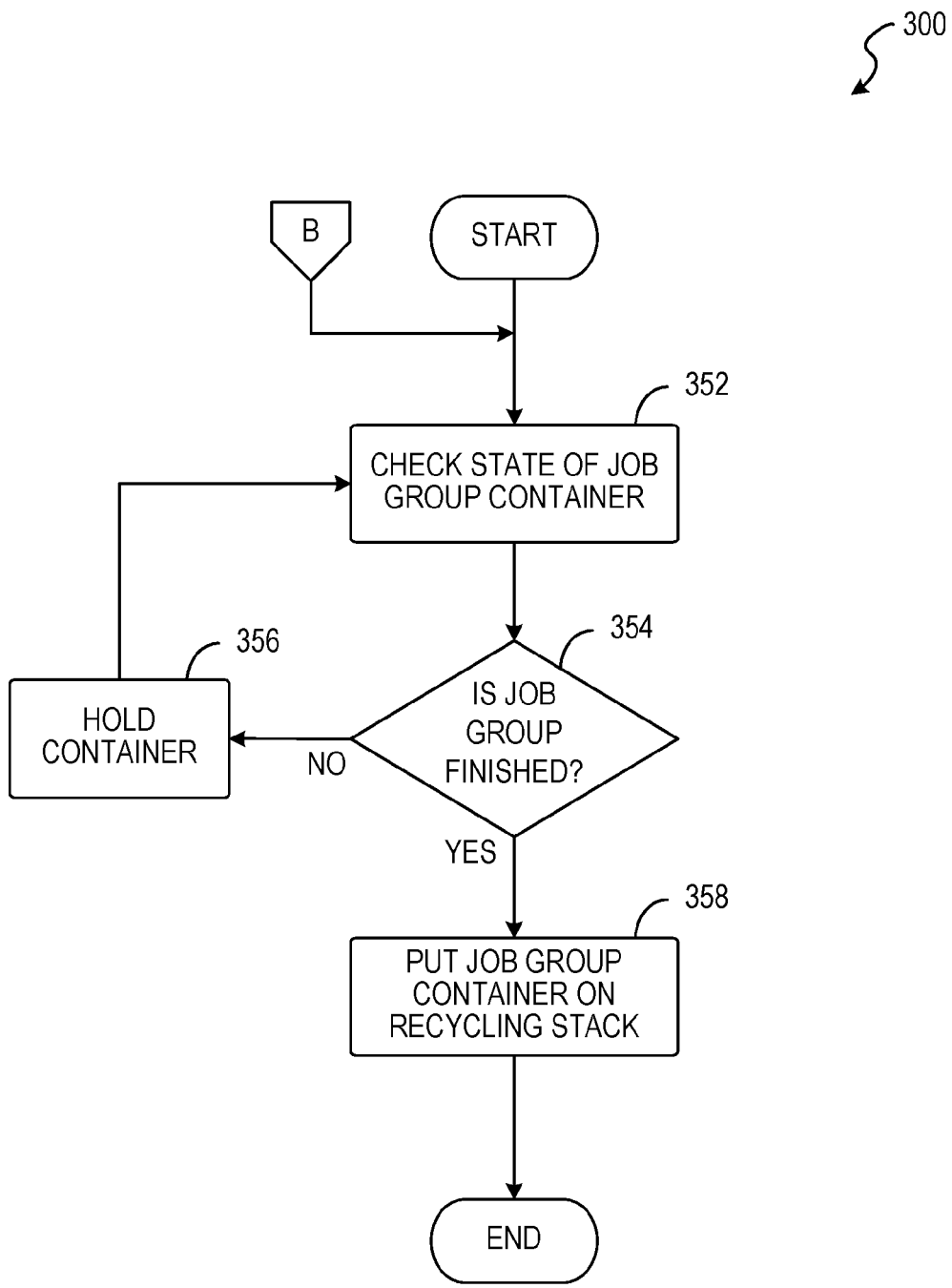
FIG. 3C illustrates operations associated with recycling job group containers from the job group queue shown in FIG. 2.

FIGS. 3A-3C each display sections of a flow chart illustrating an example method 300 for job scheduling, as performed by the job scheduler 230, that does not include stealing. FIG. 3A illustrates operations associated with dequeuing job groups 242 from the job group queue 232. FIG. 3B illustrates operations associated with the execution stack 236. FIG. 3C illustrates operations associated with recycling job group containers from the job group queue 232.

Referring now to FIG. 3A, in the example embodiment, at operation 310, the job scheduler 230 checks whether there are jobs (e.g., job groups 242) in the job group queue 232. If no job groups are available to be dequeued, the job scheduler 230 sleeps at operation 312, cycling back to test again later. If one or more job groups 242 are available for dequeuing from the job group queue 232, the job scheduler 230 dequeues a job group 242 from the job group queue 232 at operation 314. If it is determined at operation 316 that the dequeued job group 242 is empty (e.g., because the group contents were stolen while it was on the queue), that job group 242 is flagged for recycling at operation 318. Recycling of job group containers is described in greater detail below (e.g., see FIG. 3C).

If, at operation 316, the job group 242 is not empty, the job scheduler 230 atomically increments a generation counter associated with the job group 242 at operation 320. In the example embodiment, incrementing operations performed on the generation counter are performed atomically (e.g., the dequeuing and incrementing happen as one), thereby avoiding some concurrent operation situations (e.g., another thread trying to dequeue the same group, but prior to the generation counter being incremented). The job scheduler 230 extracts the job list 244 associated with the job group 242 at operation 322, as well as dependency information for the dequeued job group 242 (e.g., whether the dequeued job group depends upon any other job or job group). If, at operation 324, the dequeued job group 242 is not a dependent job group, then the jobs (e.g., from the associated job list 244) for that job group 242 are pushed onto the stack 236 for execution at operation 326, and the job scheduler 230 loops back to operation 310 to check for additional job groups.

If, at operation 324, the dequeued job group 242 is a dependent job group (e.g., identifies one or more dependency groups), then the job scheduler 230 checks the state of the dependency group at operation 328 (e.g., by checking the generation counter for the dependency group). In the example embodiment, each job group 242 may identify at most one dependency group. If, at operation 330, the dependency group is finished (e.g., all jobs from that job group are finished executing), then the jobs (e.g., from the associated job list 244) for the dependent job group 242 are pushed onto the stack 236 for execution (e.g., see operation 326), and the job scheduler 230 loops back to operation 310 to check for additional job groups. If, at operation 330, the dependency group is not yet finished (e.g., has unexecuted jobs on the stack 236, or is itself still in the job group queue 232 waiting to get on the stack 236), then the job scheduler 230 holds the dependent job group 242 at operation 332 (e.g., re-checks again later, looping to operation 328) until the dependency group is finished. Once the dependency group is found to be finished at operation 330, the job scheduler 230 pushes the jobs for the dependent job group 242 onto the stack 236 for execution and the job scheduler 230 loops back to operation 310 to check for additional job groups.

Referring now to FIG. 3B, the job scheduler 230 manages the stack 236. More specifically, in the example embodiment, the job scheduler 230 checks whether there are jobs on the stack 236 ready for execution at operation 334. If there are no jobs on the stack 236, the job scheduler returns to the dequeuing process shown and described above in reference to FIG. 3A (e.g., to operation 310). If there are jobs on the stack 236, the job scheduler 230 pops a job from the stack and sends the job for execution (e.g., to one of the CPUs 210) at operation 336. On completion of the job, the result is sent to the requesting client at operation 338 and the job scheduler 230 atomically decrements a job counter 340 (e.g., atomically) at operation 340 for the job group 242 associated with that job. At operation 342, if the job counter for that job group 242 is not zero (e.g., if there are still jobs for that job group on the stack 236), then the job scheduler cycles to pop another job from the stack 236 (e.g., at operation 336). In the example embodiment, the job scheduler 230 does not have to wait (e.g., between operation 336 and operation 338) for the job to be executed and the result returned. The job scheduler 230 may concurrently send multiple jobs from the stack 236 for execution.

If the job counter for the job group 242 is zero, then the job scheduler 230 atomically increments a generation counter for that job group 242 at operation 344 and notifies the client that the job group 242 is finished at operation 346. If a dependent job group was waiting on the completed job group 242 (e.g., if the completed job group is a dependency group) at operation 348, then the jobs from the dependent job group are loaded onto the stack 236 at operation 350 and are processed (e.g., cycling to operation 336). If the completed job group 242 is not a dependency group, then the job scheduler 230 cycles to check for more jobs on the stack 236 (e.g., cycling to operation 334).

Referring now to FIG. 3C, the job scheduler 230 recycles job group containers (e.g., the memory region of an empty, completed job group 242). More specifically, in the example embodiment, the job scheduler 230 checks the state of the job group container at operation 352. If, at operation 354, the associated job group 242 is not finished, then the container is held at operation 356, and the job scheduler cycles to operation 352. If the job group is finished, then the job scheduler 230 puts the job group container on a recycling stack for later reuse at operation 358.

In the example embodiment, the processes involved in dequeuing the jobs as shown in FIG. 3A, the process involved in stack operations as shown in FIG. 3B, and the process involved in recycling as shown in FIG. 3C may occur concurrently, excepting the atomic operations described above. In other words, the processes shown in FIGS. 3A-3C may be interleaved such as to all be happening at the same time.

Figure 4:
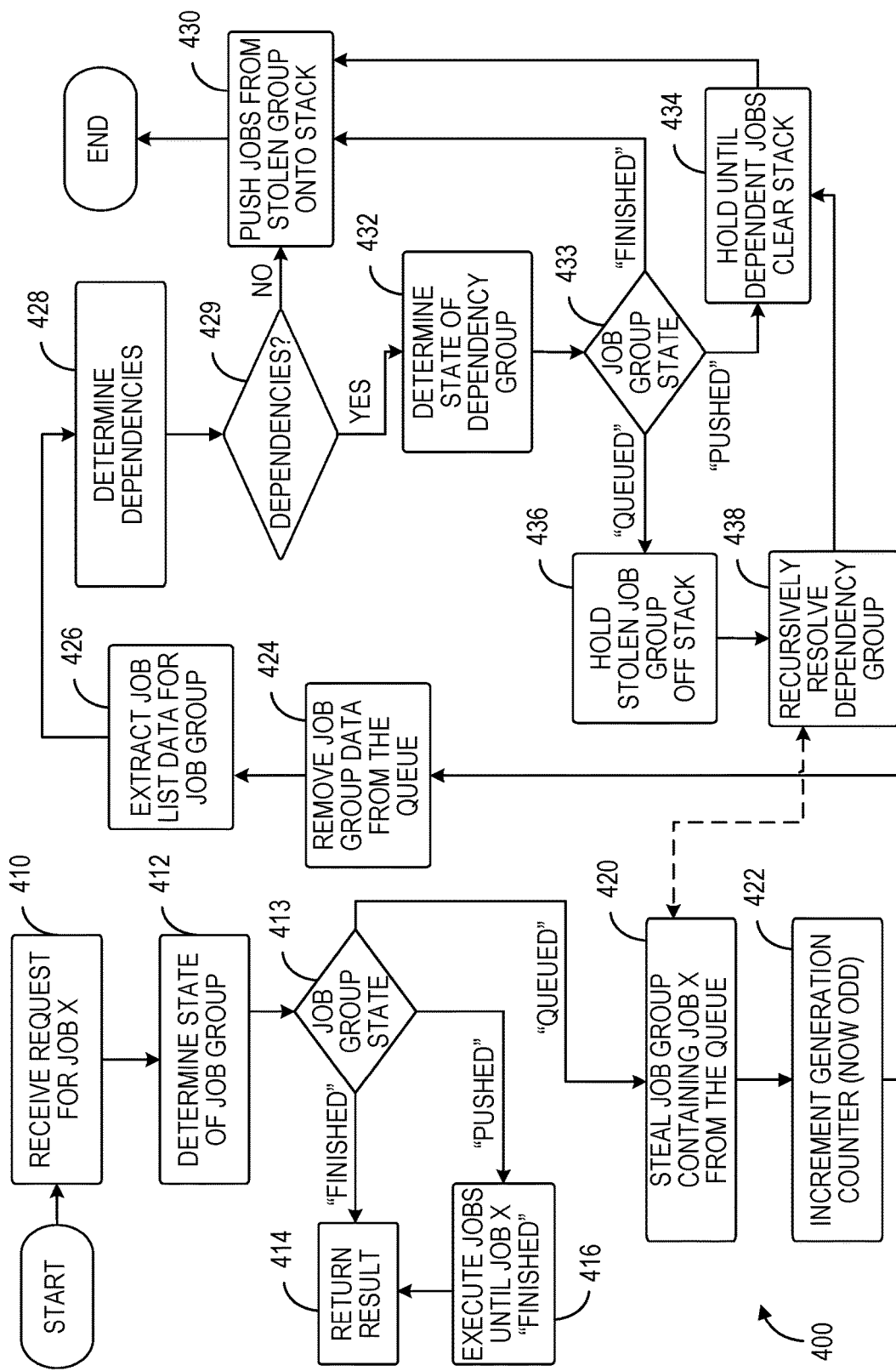
FIG. 4 is a flow chart of a method for job scheduling as performed by the job scheduler that includes job stealing.

FIG. 4 is a flowchart of a method 400 for job scheduling as performed by the job scheduler 230 that includes job stealing. Job stealing involves preempting the order of the job groups 242 in the job group queue 232. At operation 410, the job scheduler 230 receives a request associated with Job X (e.g., a request for the value of a calculation that results from the execution of Job X). The request, for example, may originate from a software application such as a game engine, perhaps in response to an action from a user (e.g., via an application thread associated with the game engine). As used herein, the term "client" is used to refer to the requesting application (e.g., game engine), process, thread, or CPU.

At operation 412, the job scheduler 230 determines the state of Job X (e.g., of the job group 242 containing Job X). In the example embodiment, the job scheduler 230 performs operation 412 using the generation counter for the job group 242 and the finished generation count (e.g., from the ticket). The states available for a job group 242 include: "Queued" (e.g., in the queue 232), "Pushed" (e.g., being executed by a CPU 210, on the stack 236, or waiting to get on the stack 236), or "Finished" (e.g., execution completed). Some of these states may be distinguished from others using the generation counter and/or the job counter. If, at operation 413, the state of the job group 242 is Finished (e.g., if the generation counter equals the finished generation count), then the result of the job is available (e.g., because the job's execution is complete) and the result is returned to the client via the client thread at operation 414. If, at operation 413, the state of Job X is Pushed (e.g., if the generation counter is odd, or if the generation counter equals one less than the finished generation count), then Job X is already on the stack 236 or is waiting to get on the stack 236 and, as such, the job scheduler 230, at operation 416, pops jobs off the stack and executes those jobs until Job X is Finished. When Job X is finished (e.g., finished executing within a core), the result of the job is available, and the job scheduler 230 returns the result to the client via the client thread at operation 414.

If, at operation 413, the state of Job X is Queued (e.g., if the generation counter is even and not equal to the finished generation count, or if the generation counter is two less than the finished generation count), then the job scheduler 230 extracts ("steals") the job group 242 containing Job X from the queue 232 at operation 420. Stealing a job includes at least several steps. First, at operation 422, the job scheduler 230 atomically increments the generation counter for the job group 242 (e.g., making the generation counter odd and making the generation counter equal to one less than the finished generation count, signifying that the job group has been stolen). In the example embodiment, operations 420 and 422 are performed atomically. In some embodiments, operations 420 and 422 may be combined into a single atomic operation. The job scheduler 230 then removes the job list 244 of the job group 242 in the queue 232 at operation 424, leaving the group container in the queue (e.g., with an empty job list 244 containing only a null pointer). At operation 426, the job scheduler 230 extracts job list data from the associated job list 244, leaving an empty job list 244 (e.g., a single element containing a null pointer).

The job scheduler 230 then analyzes the dependency data for the job group 242 to determine all dependencies for all the jobs in that job group 242 at operation 428. The dependency data specifies, or can be used to determine, which secondary jobs (e.g., which other job groups 242) must be executed prior to the execution of the stolen job (e.g., the job group 242 including Job X).

If, at operation 429, no dependencies are specified within the dependency data, or if there is no dependency data, then the job scheduler 230 pushes all of the stolen jobs (e.g., all of the jobs from the job list 244 associated with the stolen job group 242) onto the stack 236 at operation 430. Since there are no dependency conflicts prior to placement of jobs 244 of the stolen job group 242 on the execution stack, the jobs can safely be executed (e.g., in any order, and thus can be processed by any thread with any core). In some embodiments, each job group 242 is packaged such that the jobs within the group 242 do not depend on each other (e.g., they can be executed in any order), and each group depends on at most one other group. In other embodiments, each job group can depend on multiple other job groups 242.

If, at operation 429, the stolen job group 242 includes one or more specified dependencies, then for each dependency group (e.g., dependency group $Y_i$, where i=1 ... N, and where N is the number dependencies), the job scheduler 230 determines the state of the dependency $Y_i$ at operation 432. In the example embodiment, each job group 242 includes at most one dependency group, Y. The dependency group Y refers to a specific dependency job group 242 for the job group 242 containing Job X. The dependency group Y may be in any state mentioned above (e.g., Queued, Pushed, or Finished). The simplest case is if a dependency group Y is already executed (e.g., "Finished") at operation 433. In this case, the job scheduler 230 pushes the jobs from the stolen job group 242 directly onto the execution stack 236 at operation 430 and ends, thereby completing the steal of the job group 242.

If, at operation 433, the dependency group Y is in the pushed state (e.g., is already on the stack 236), then the job scheduler 230 holds the dependent job group, at operation 434, until the jobs clear the stack 236 prior to pushing the stolen job group 242 containing Job X onto the stack 236 at operation 430. If, at operation 433, the dependency group Y is still in the queued state (e.g., in the job group queue 232), then the job scheduler 230 holds the stolen job group 242 from entering the stack 236 at operation 436 and resolves the dependency group Y (e.g., recursively cycle to operation 420, initiating a steal operation on the dependency group Y) at operation 438. In other words, the initial stolen job group 242 is not put on the execution stack 236 until the job scheduler 230 steals the dependency group Y from the queue 232, resolves any of its dependencies (e.g., recursively), and then places them on the stack 236 so that they can be executed. After the dependencies are executed on the stack 236, then the job scheduler waits for those dependent jobs to clear the stack at operation 434 before pushing the jobs from the stolen job group 242 onto the stack 236 at operation 430.

In some embodiments, the processes executing the method 400 shown in FIG. 4 may execute concurrently with the processes executing the method 300 shown in FIGS. 3A-3C, excepting the atomic operations described above. In some embodiments, any or all of the operations shown in methods 300, 400 are performed atomically. In some embodiments, some operations are combined into a single atomic operation. For example, in some embodiments, operations 420 and 422 may be combined into a single atomic operation. In other embodiments, operations 412/413, 420, and 422 may be combined into a single atomic operation. In some of these embodiments, operation 424 may also be included in the combined atomic operation.

In some scenarios, it may be possible for multiple threads to attempt to steal the same job group from the queue 232. For example, a first thread and a second thread may attempt to steal a job group, and may both test the state of the job group (e.g., operations 412/413) at a time when the job group is still available to steal (e.g., before either thread executes atomic operation 420/422). In one example embodiment, until one of the two threads actually performs operations 420/422 (e.g., atomically), either of the two threads may initiate operations 420/422. The first thread to execute operations 420/422 effectively makes the job group unavailable to steal to the other thread. For example, presume both threads test the state of the job group at operations 412/413, and both threads see the job group as available to steal. Subsequently, both threads are going to attempt to steal the job group, because both have tested and determined that the job group is available to steal. The first thread is the first to atomically execute operations 420/422, thereby succeeding in the steal (e.g., moving the job list for the stolen job group to the execution stack 236 and emptying the job group). The second thread then attempts to steal the job group and fails (e.g., at operation 420) because the job group is no longer available to steal (e.g., because the job group is now empty). As such, the first thread succeeds in the steal and the second thread fails its steal attempt.

FIGS. 5 to 10 depict the example device 200 and job scheduler 230 in example scenarios during operation. As shown in the example scenario of FIG. 5, the job group queue 232 includes multiple job groups 512 awaiting execution (e.g., "Group A" 512A, "Group N" 512N, "Group B" 512B, "Group C" 512C, and "Group D" 512D). Each job group 512 in the job group queue 232 has an associated job list 514 (e.g., "List A" 514A, "List N" 514N, "List B" 514B, "List C" 514C, and "List D" 514D, respectively). For example, in the context of graphics processing for a game engine, Group D 514D may compute the position of many virtual characters, Group C 514C may perform collision detection on those characters, Group B 514B may recompute new positions in response to collisions according to a gaming physics, and Group A 514A may prepare the whole scene for rendering on the GPU. As such, Group A 514A may depend on Group B 514B, Group B 514B may depend on Group C 514C, and Group C 514C may depend upon Group D 514D.

In the example embodiment, another job group 512O, "Group O," along with an associated job list 514O, "List O," is passed to the job scheduler 230 (e.g., from one of the CPUs 210) for addition to the job group queue 232. The job groups 512 may be similar to the job groups 242, and the job lists 514 may be similar to the job lists 244. While the job lists 244, 514 are shown in FIGS. 2 and 5-10 separately from the job groups 242, 512 for purposes of illustration, in some embodiments, the job lists 244, 514 may be integrated into or within the job groups 242, 512 themselves.

Figure 5:
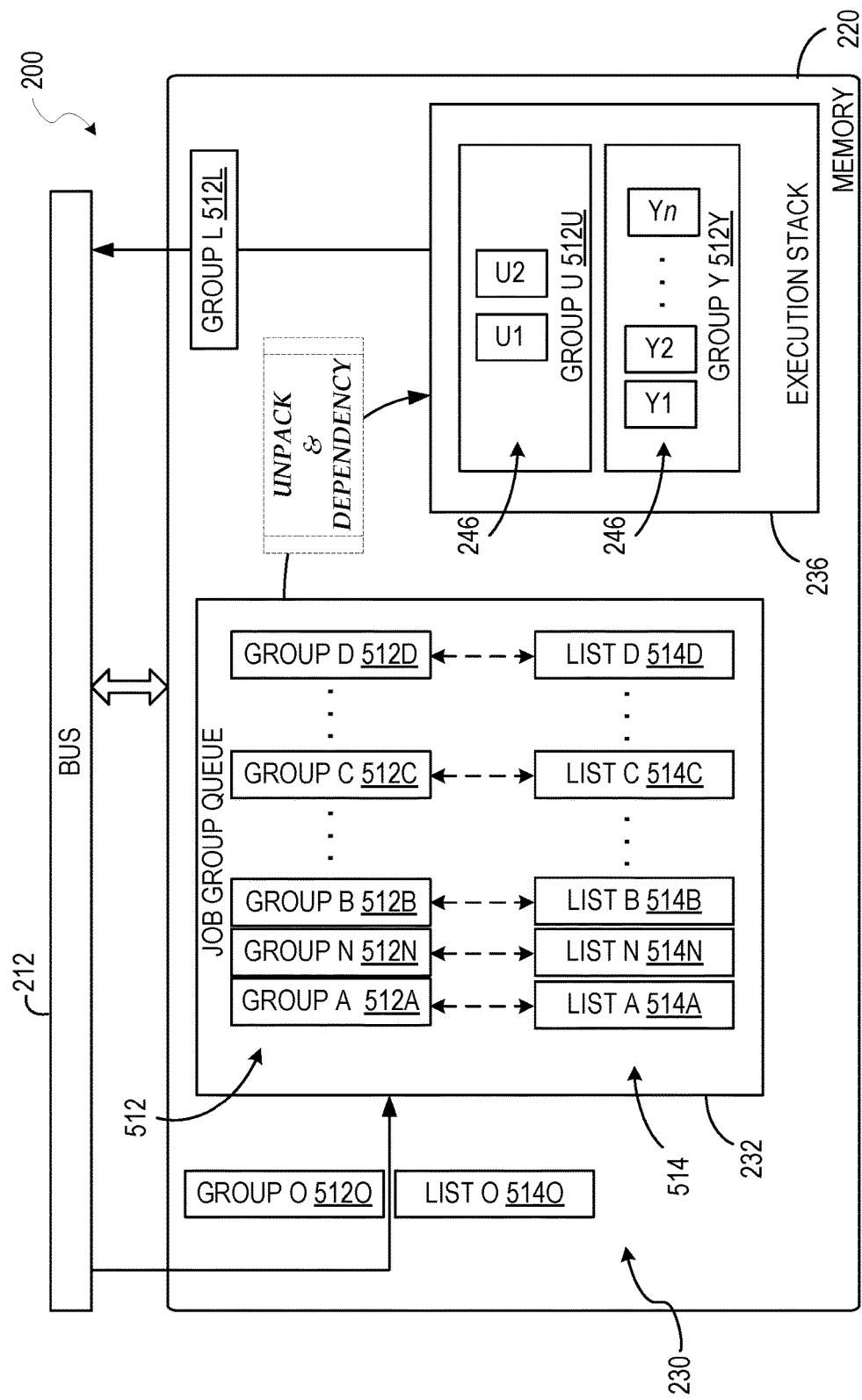
FIG. 5 is a diagram of the example device and job scheduler in example scenarios during operation.

The execution stack 236 includes two groups, "Group U" 512U and "Group Y" 512Y, each having multiple jobs 246 (e.g., jobs from their associated job lists 514, illustrated in FIG. 5 as "U1," "U2," and "Y1" through "Yn"). It should be understood that the jobs 246 are illustrated on the execution stack 236 in FIGS. 2 and 5-10 grouped together for purposes of description, but, as mentioned above, the execution stack 236 is a LIFO structure and, as such, the queue is an ordered set of jobs (e.g., each of the jobs from the illustrated groups), where the top-most group in the stack 236 represents the top-most jobs. The jobs on the stack 236 are handled as individual jobs. In other words, they may be picked up by different threads and may be sent to different processors for execution. The job scheduler 230 may track the jobs of a particular job group 242 (e.g., with the job counter and generation counter).

In this example, though not illustrated in FIG. 5, Group A 512A has 100 jobs, Group B 512B has 1 job, Group C 512C has 50 jobs, and Group D 512D has 1 job. Further, Groups A-D 512A-512D also include interdependencies. More specifically, the dependencies of the four job groups are as follows: Group A 512A depends on Group B 512B, Group B 512B depends on Group C 512C, and Group C 512C depends on Group D 512D. The scheduling order is illustrated from right to left within the job group queue 232 as shown in FIG. 5. As such, Group D 512D is scheduled, followed by some unidentified groups, then Group C 512C, followed by other unidentified groups, then Group B 512B, Group N 512N, and Group A 512A. Each of these scheduled groups will proceed according to the above order unless that scheduling order is interrupted, for example, by a call to steal one of the four groups (e.g., if there is a call or a 'wait' for a value resulting from the execution of one of these groups which necessitates a steal).

Further, jobs for a "Group L" 512L are being sent from the stack 236 to the bus 212 (e.g., for execution on one of the CPUs 210). It should be understood that jobs from the stack 236 are sent to the bus 212 for execution individually, and are illustrated as grouped in these examples for ease of discussion.

Figure 6:
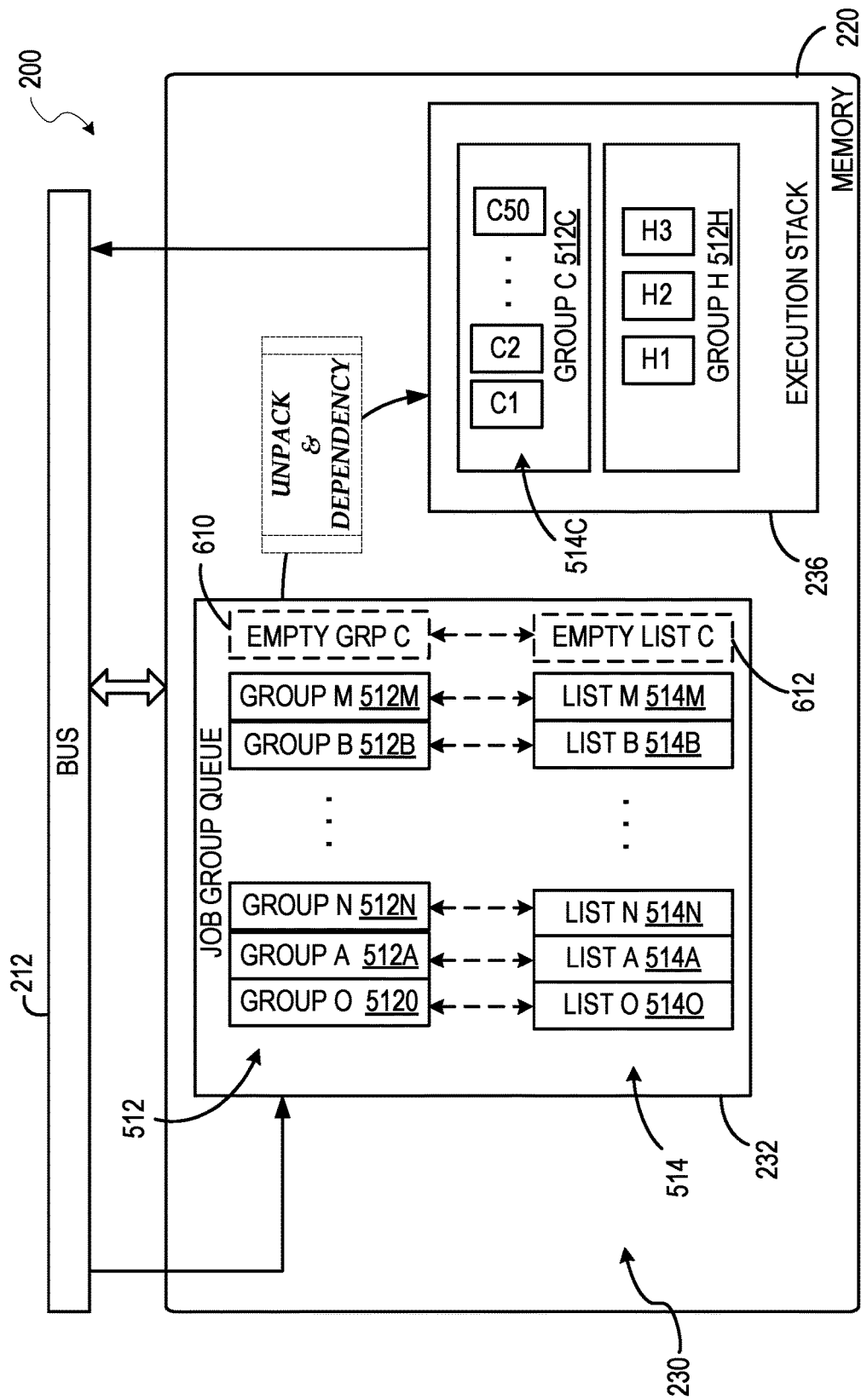
FIG. 6 illustrates the state of the job scheduler at a later point in time, continuing the example of FIG. 5.

Continuing the example, FIG. 6 illustrates the state of the job scheduler 230 at a later point in time. Here, "Group O" 512O has been added to the job group queue 232, and an application (the client, e.g., the user script of a game) requires the resulting value of the execution of Group A 512A. The application signals the requirement by issuing a "wait" on the A group 512A in the job scheduling system (e.g., with the job scheduler 230).

At this point in time, Group A 512A and Group B 512B are in the queue 232 as shown, jobs from Group C 512C are on the execution stack 236, and Group D 512D is finished. When Group C 512C was moved from the queue 232 to the execution stack 236, the group container 610 for Group C 512C (e.g., the memory being used by Group C 512C while on the queue 232) was emptied, and may be recycled once all associated jobs are completed. Further, because the jobs 514C for Group C 512C were moved to the stack 236, the associated job list 612 for Group C 512C is emptied (e.g., jobs C1 to C50 have moved to the stack 236 and the job list 514C contains a null pointer), but the job group container 610 is maintained and used while the jobs 514C for Group C 512C (e.g., jobs C1, C2, . . . , C50) are on the stack 236. Once the jobs 514C are finished on the stack 236, the job scheduler 230 will check the job list 612 for Group C 512C (e.g., until empty). If the job list 612 contains another list (e.g., one or more additional jobs, such as from job groups dependent on Group C 512C, added as described below), then this additional list of jobs 514C is also placed on the stack 236 for execution. When the job list 612 is determined to be empty, then it will be recycled along with the empty group container 610. In other words, the job scheduler 230 maintains the job group container 610 (e.g., for Group C 512C) until it is determined that all jobs associated with that group have completed (e.g., including all dependent jobs).

Figure 7:
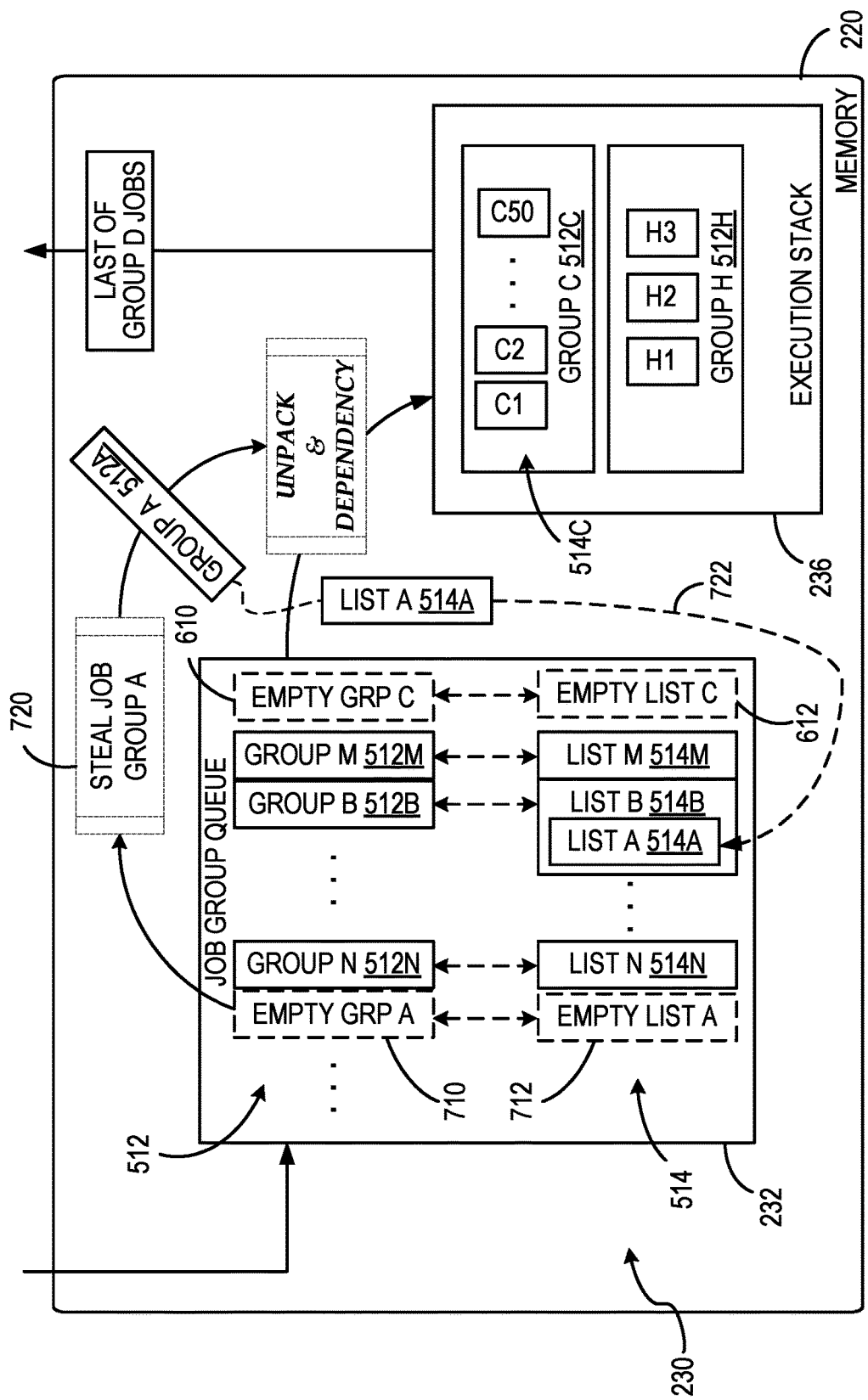
FIG. 7 illustrates a steal operation for group A performed by the job scheduler, continuing the example of FIGS. 5-6.

FIG. 7 illustrates a steal operation 720 for group A 512A performed by the job scheduler 230. Continuing the example, receipt of the "wait" on Group A 512A triggers the steal operation 720 for Group A 512A. Presume that, at the time the steal operation 720 is initiated, the generation counter for group A is set to 100, the generation counter for group B is set to 200, and the generation counter for C is set to 301 (e.g., because it is on the stack). Accordingly, the ticket value for group A is 102, the ticket value for group B is 202, and the ticket value for group C is 302 since the ticket value is equal to the initial generation counter value+2. The steal operation 720 will proceed if Group A 512A is still in the queue 232 and no other thread has stolen it, such as shown in FIG. 7 (e.g., see also operation 412). In other situations, the steal attempt would fail if, for example, another thread has already stolen Group A 512A, or if Group A 512A had moved off the job group queue 232 and onto the execution stack 236 (e.g., if the generation counter for the job group is odd, or not equal to the ticket value−2).

Returning to the example shown here, the stealing operation 720 of Group A 512A starts with the removal of the Group A 512A data from a Group A container 710 on the queue 232, including the removal of the group A job list 514A data. If Group A 512A is stolen successfully, the job scheduler 230 atomically increments the generation counter for Group A 512A by one (e.g., from 100 to 101). Since, in this example, Group A 512A depends on Group B 512B, which is still in the queue 232 at the time Group A was stolen, the job scheduler 230 cannot put the job list for Group A 512A on the stack. As such, the job scheduler 230 attempts to steal Group B 512B in order to resolve the dependency for Group A 512A. Since Group A 512A depends on Group B 512B, the job list data for group A (e.g., List A 514A) is moved to the back of the job list for Group B 512B (e.g., List B 514B) after Group B has been stolen so that the jobs of List A 514A can be executed after the jobs in Group B 512B. Moving the job list for Group A 512A at the back of the job list for Group B 512B (e.g., List B 514B, as illustrated by broken line 722) may be implemented, for example, by linking the tail of the linked list for List B 514B to the head of the linked list for List A 514A.

At this point, a job list 712 for Group A 512A is empty, and so is the job group container 710 for group A 512A in the queue 232. The job list 712 and the job group container 710 may be recycled once the job group container 712 has dequeued and the associated job list has been emptied of all dependent jobs and job lists.

Figure 8:
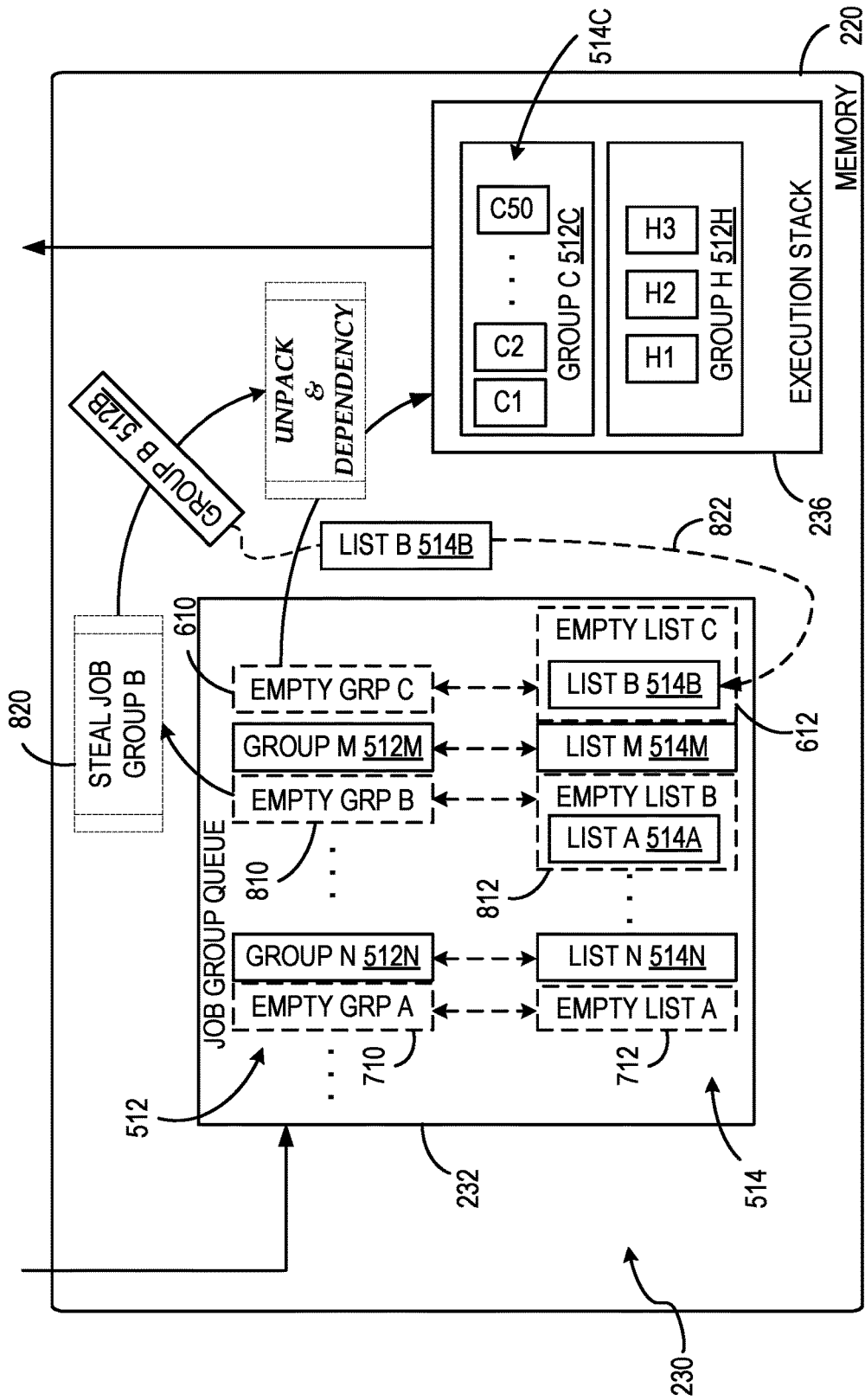
FIG. 8 illustrates a stealing of Group B operation, as caused by the stealing of Group A operation, continuing the example of FIGS. 5-7.

Continuing the example, FIG. 8 illustrates a stealing of Group B operation 820, in reaction to the stealing of Group A operation 720. In this example, the stealing of Group B 512B is successful and, as such, the system increments the counter for Group B 512B by 1 (e.g., from 200 to 201). Since Group B 512B depends on Group C 512C, the job scheduler 230 tries to steal Group C 512C (not depicted), which fails because the jobs from Group C 512C are already on the execution stack 236 (e.g., see operation 416). More specifically, the steal of Group C 512C fails because the Group C container 610 is empty, and the generation counter for Group C 512C is odd (and the generation counter=ticket value−1), signaling that it is in the pushed state and is no longer on the queue. Group C 512C was previously added to the stack 236 because Group C 512C depends on Group D 512D, and Group D 512D is finished, thus making it safe to put Group C 512C on the stack 236. It should be noted that the placement of Group C 512C on the stack 236 is not directly shown in a figure, but occurred between the actions depicted in FIG. 5 and FIG. 6.

At this point, the execution of Group C 512C is not yet complete. As such, the job scheduler 230 pushes Group B 512B (e.g., the job list B 514B) to the back of the job list for Group C (e.g., job list container 612, "Empty List C"), as illustrated by the broken line 822. This is possible because Group C 512C has not yet completed execution, and the job list for Group C 512C (e.g., job list container 612) has not been recycled.

During operation, one or more threads start to pop jobs from the stack 236 (e.g., jobs 514C, "C1"-"C50") and execute them. The job counter for Group C 512C initially starts at 50 (e.g., since Group C 512C has 50 jobs). For each job executed from Group C 512C, the job counter is atomically decremented by 1. When all the jobs 514C on the stack 236 are complete for Group C 512C, the job counter for Group C 512C reaches zero, and the generation count for Group C is atomically incremented by 1 to 302.

Figure 9:
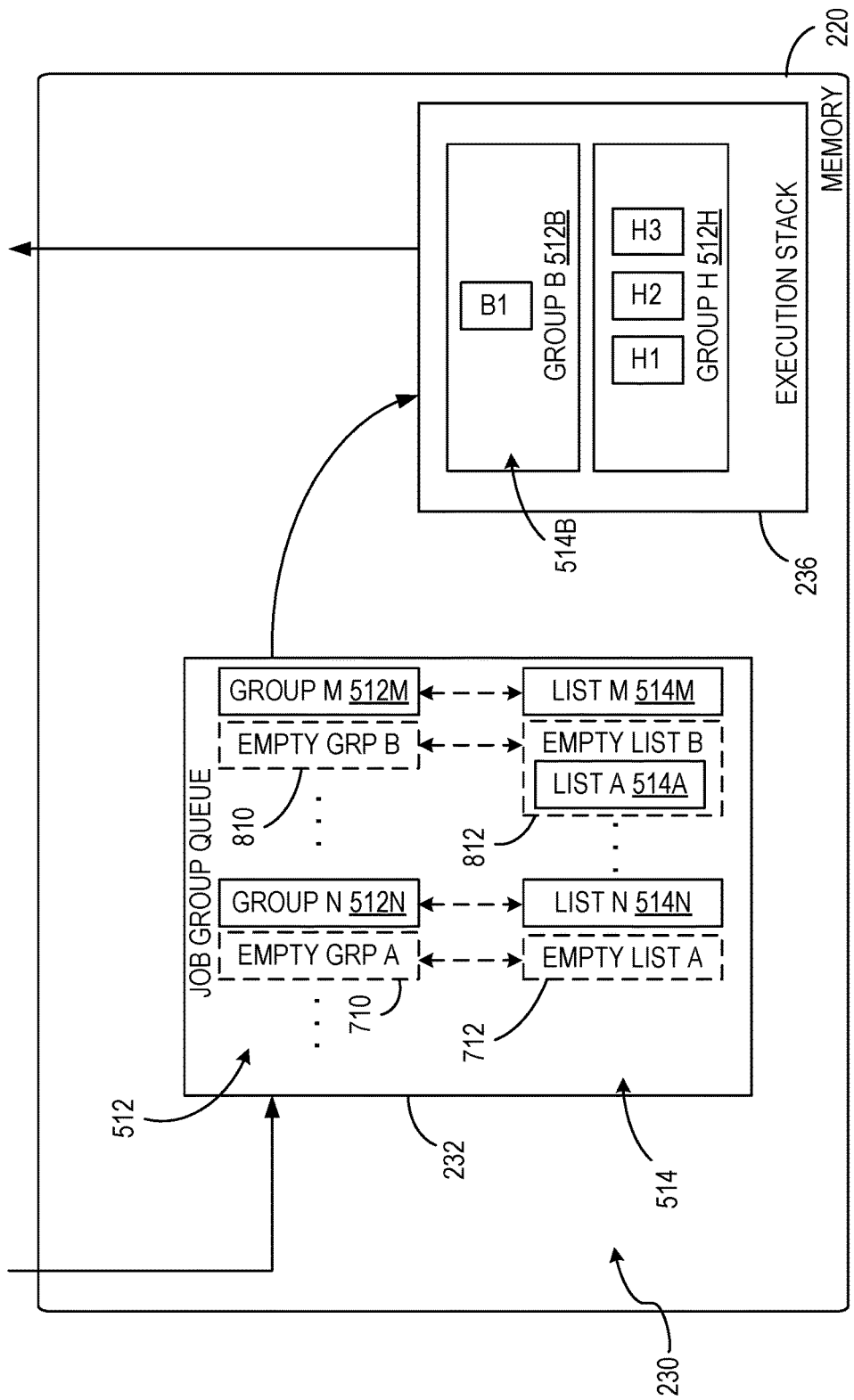
FIG. 9 illustrates the job scheduler after Group C is finished on the stack, continuing the example of FIGS. 5-8.

FIG. 9 illustrates the job scheduler 230 after the jobs for Group C 512C are finished on the stack 236. Continuing the example, when the last of the Group C jobs 514C are finished (e.g., taken from the stack 236 and executed by a CPU), Group C 512C is marked as done by atomically incrementing the generation counter for Group C 512C by one, thereby making the generation counter match the ticket value. The job scheduler 230 checks the job list for Group C (e.g., the job list 612) for additional jobs and finds the job list for Group B (e.g., List B 514B), as illustrated in FIG. 8. List B 514B is put on the execution stack 236. The job scheduler 230 determines that the job list 612 is now empty and, as such, the job list 612 and job group container 610 for Group C 514C are recycled.

In this example, the job list 514B for Group B 512B has a single job, "B1," now at the head of the stack 236. As such, the first thread to execute that job will cause the job scheduler 230 to atomically increment the generation count for Group B 512B to 202 (e.g., marking it as finished since the generation count=the ticket value).

Figure 10:
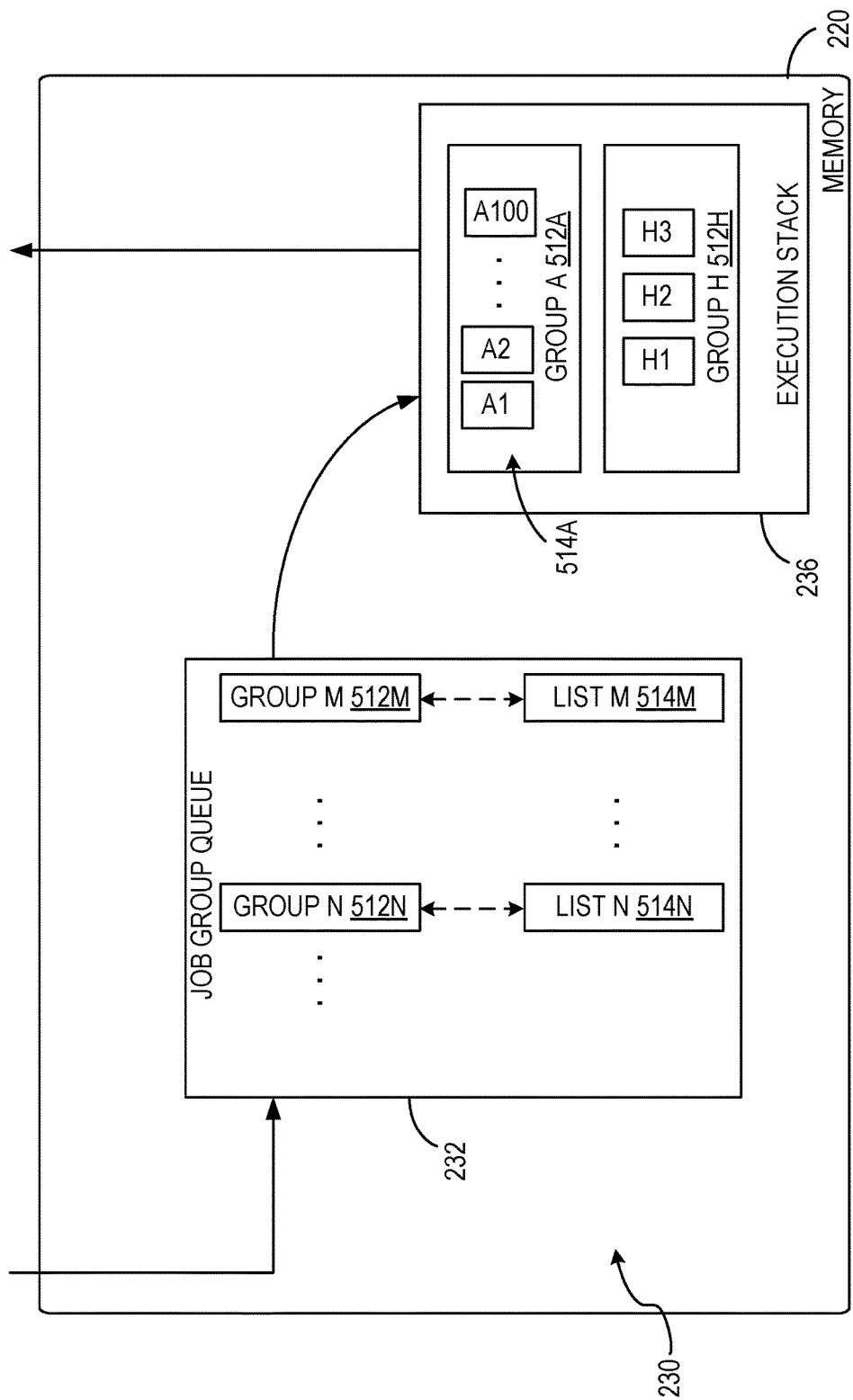
FIG. 10 illustrates the finishing of Group A, continuing the example of FIGS. 5-9.

FIG. 10 illustrates the finishing of Group A 512A. Since all of the jobs in the job list 514B are now finished, the job scheduler 230 then checks a job list 812 for Group B 514B for jobs that depend on Group B 512B and finds the job list 514A for Group A 512A, as illustrated in FIG. 9. The job scheduler 230 then pushes the job list 514A onto the stack 236 and recycles the job list 812 and a job container 810 for Group B 512B. Threads pop jobs from the job list 514A (e.g., from the stack 236) and, after each job is completed, atomically decrement the job counter for Group A 512A until all of the jobs in the job list 514A complete execution and the job counter reaches zero. When Group A 512A is finished, the generation count for Group A is atomically incremented by one (e.g., to 102), thereby marking Group A 512A as finished since the generation counter is equal to the ticket value. The job scheduler 230 then checks the job list 712 for Group A 514A, finds no additional jobs, and subsequently recycles the job list 712 and job group container 710.

At this point, the client thread that issued the wait on Group A 512A detects that it has finished (e.g., because the ticket value of 102 for Group A matches the generation count of 102 for Group A 512A). As such, it will return to the application with the value from the execution of Group A 512A.

The example shown in FIGS. 5 to 10 illustrate a simple dependency chain. In some embodiments, it is possible that another group or groups (e.g., Group E, not shown) may also depend on Group B 512B, Group C 512C, or Group D 512D. As such, the Group E job list may get added to the job list for group B, group C, or group D to be scheduled when their respective lists are finished. Accordingly, the job scheduler 230 may scale to any number of jobs and dependencies.

For example, consider the following example with groups including job lists implemented as linked lists, whereby two groups each depend upon a third group. In this example, a Group G1 includes jobs X, Y, and Z (annotated as G1(X-Y-Z), where dashes indicate the linked order with the last job unlinked to another), a Group G2 includes jobs D, E, F, G, and H (i.e., G2(D-E-F-G-H)), and a Group G3 includes jobs A, B, and C (i.e., G3(A-B-C)). Further, Groups G2 and G3 both depend on G1. In this example, Group G1 is dequeued first, and its jobs are put on the stack 236. As such, the G1 job list is empty, and its generation count is odd. As part of this example, while the G1 job list is still on the stack 236, Group G2 is then dequeued. Since G2's dependency (e.g., G1) is still on the stack 236, the G2 jobs (D-E-F-G-H) are added to the G1 job list, which was emptied when all of the G1 jobs were put on the stack 236). Further, while the G1 job list is still on the stack 236, Group G3 is then dequeued. As such, the G3 jobs (A-B-C) are also added to G1's job list (e.g., linked to the end), resulting in the linked list (D-E-F-G-H-A-B-C). When the original G1 jobs are finished, the scheduler 230 retrieves the jobs (D-E-F-G-H-A-B-C) from the G1 job list and places them on the stack 236. Note that because each group has no internal dependencies, and G2 does not depend on G3, the ordering of the list does not matter in this example, allowing the G2 list to be appended to the end of the G3 list, or vice versa. In other words, once the G1 jobs are complete, any of the jobs A, B, C, D, E, F, G, H may be safely executed in any order.

Further, the job scheduler 230 and devices 200 described herein may include multiple cores adding jobs to the queue 232 simultaneously, while at the same time there may be multiple cores executing jobs simultaneously. The combination of the queue 232, the stack 236, the counting system, and the stealing mechanism described herein lead to better performance and more reliability than existing lock-free solutions, which constitutes an improvement to the functioning of the computer itself.

The detailed examples of how to use a job scheduling system, according to the disclosure, are presented herein for illustration of the disclosure and its benefits. Such examples of use should not be construed to be limitations on the logical process embodiments of the disclosure, nor should variations of user interface methods from those described herein be considered outside the scope of the present disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 11:
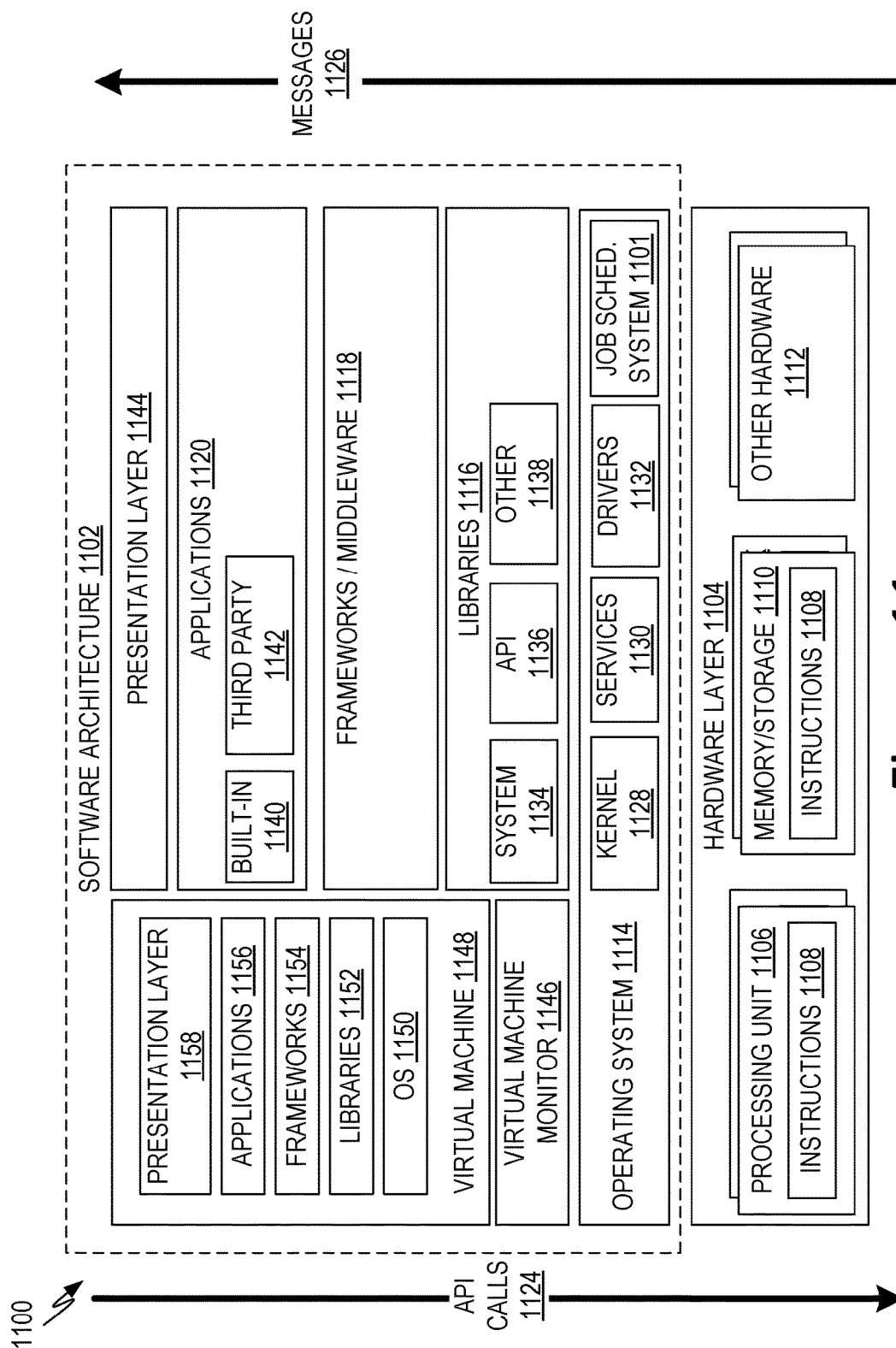
FIG. 11 is a block diagram illustrating an example software architecture, which may be used in conjunction with various hardware architectures herein described to provide a job scheduler system, which may be similar to the job scheduler shown in FIGS. 2 and 5-10.

FIG. 11 is a block diagram 1100 illustrating an example software architecture 1102, which may be used in conjunction with various hardware architectures herein described to provide a job scheduler system 1101, which may be similar to the job scheduler 230 as described above. FIG. 11 is a non-limiting example of a software architecture and it will be appreciated that many other architectures may be implemented to facilitate the functionality described herein. The software architecture 1102 may execute on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 includes a processing unit 1106 having associated executable instructions 1108. The executable instructions 1108 represent the executable instructions of the software architecture 1102, including implementation of the methods, modules and so forth described herein. The hardware layer 1104 also includes memory/storage 1110, which also includes the executable instructions 1108. The hardware layer 1104 may also comprise other hardware 1112.

In the example architecture of FIG. 11, the software architecture 1102 may be conceptualized as a stack of layers where each layer provides particular functionality. For example, the software architecture 1102 may include layers such as an operating system 1114, libraries 1116, frameworks or middleware 1118, applications 1120 and a presentation layer 1144. Operationally, the applications 1120 and/or other components within the layers may invoke API calls 1124 through the software stack and receive a response as messages 1126. The layers illustrated are representative in nature and not all software architectures have all layers. For example, some mobile or special purpose operating systems may not provide the frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be used by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) provide a higher-level common infrastructure that may be used by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1142 may invoke the API calls 1124 provided by the mobile operating system such as operating system 1114 to facilitate functionality described herein.

The applications 1120 may use built-in operating system functions (e.g., kernel 1128, services 1130 and/or drivers 1132), libraries 1116, or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures use virtual machines. In the example of FIG. 11, this is illustrated by a virtual machine 1148. The virtual machine 1148 creates a software environment where applications/modules can execute as if they were executing on a hardware machine (such as the machine 1200 of FIG. 12, for example). The virtual machine 1148 is hosted by a host operating system (e.g., operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks 1154, applications 1156, and/or a presentation layer 1158. These layers of software architecture executing within the virtual machine 1148 can be the same as corresponding layers previously described or may be different.

Figure 12:
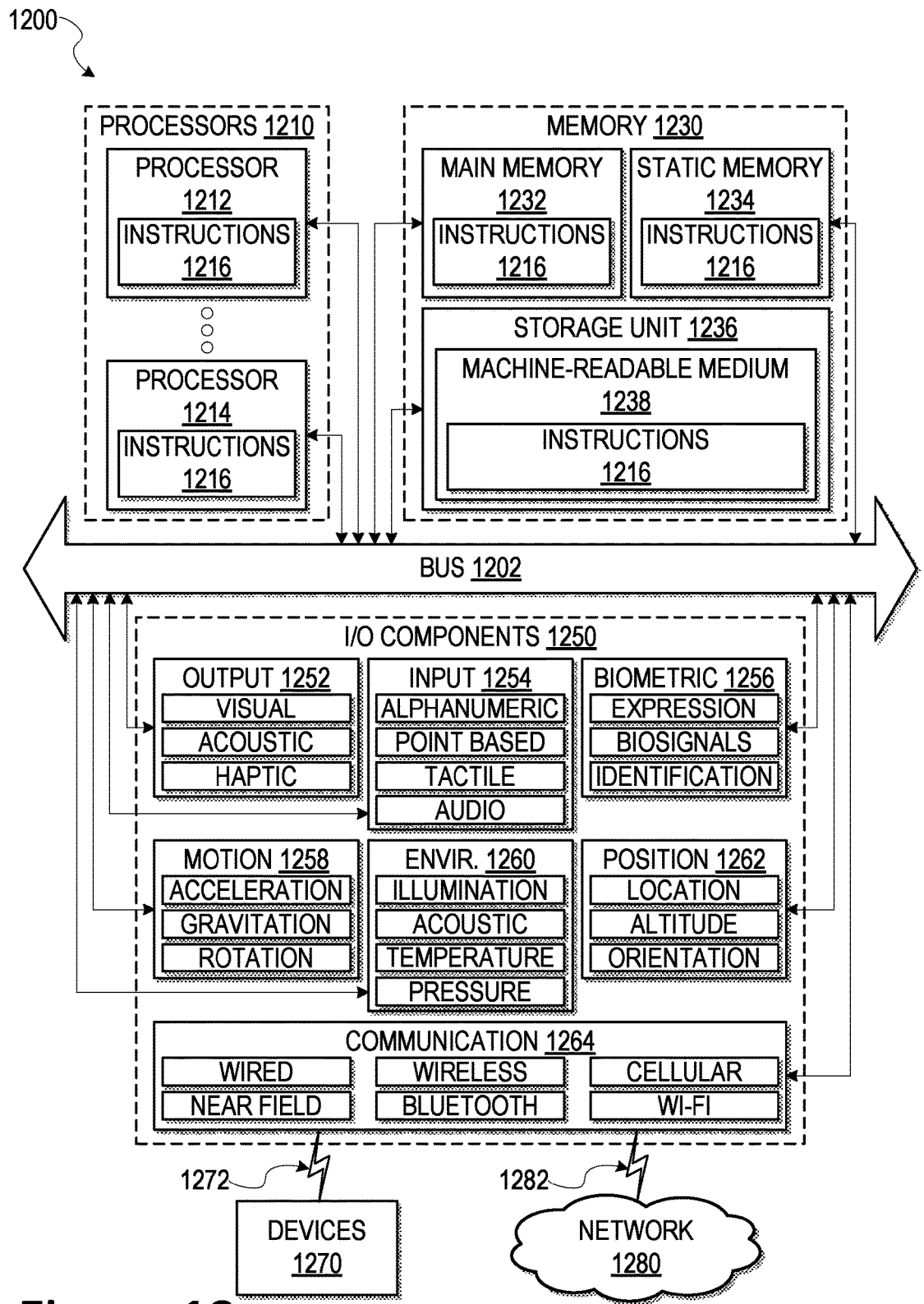
FIG. 12 is a block diagram illustrating components of a machine, according to some example embodiments, configured to read instructions from a machine-readable medium (e.g., a machine-readable storage medium) and perform any one or more of the methodologies discussed herein.

FIG. 12 is a block diagram illustrating components of a machine 1200, according to some example embodiments, configured to read instructions from a machine-readable medium (e.g., a machine-readable storage medium) and perform any one or more of the methodologies discussed herein. In some embodiments, the machine 110 is similar to the computing device 200 shown in FIGS. 2-10. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. As such, the instructions 1216 may be used to implement modules or components described herein. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines that individually or jointly execute the instructions 1216 to perform any one or more of the methodologies discussed herein.

The machine 1200 may include processors 1210, memory 1230, and input/output (I/O) components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory/storage 1230 may include a memory, such as a main memory 1232, a static memory 1234, or other memory, and a storage unit 1236, all accessible to the processors 1210 such as via the bus 1202. The storage unit 1236 and memory 1232, 1234 store the instructions 1216 embodying any one or more of the methodologies or functions described herein. The instructions 1216 may also reside, completely or partially, within the memory 1232, 1234, within the storage unit 1236, within at least one of the processors 1210 (e.g., within the processor's cache memory), or any suitable combination thereof, during execution thereof by the machine 1200. Accordingly, the memory 1232, 1234, the storage unit 1236, and the memory of processors 1210 are examples of machine-readable media 1238.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1262, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A job scheduler system comprising:
   one or more hardware processors; and
   a job scheduler engine having a memory and an execution stack,
   wherein the memory includes a job group queue,
   wherein the job group queue includes a plurality of job groups, each job group of the plurality of job groups includes one or more jobs for execution by the one or more hardware processors, and each job group includes an associated generation counter that is used, at least in part, to track a state of the associated job group, wherein the state identifies when the job group has been dequeued or stolen and the job group is in one of three places: (i) on the execution stack, (ii) waiting to get on the execution stack, (iii) being executed,
   wherein the job scheduler engine, executable by the one or more hardware processors, is configured to perform operations comprising:
      creating a first job group in the job group queue for an application submitting the first job group to be executed, the first job group includes a generation counter identifying one or more of an initial generation count value when the job group is considered available to steal and a finish generation count value when the first job group is considered finished;
      transmitting a ticket associated with the first job group to the application, the ticket includes a ticket value for the first job group, the ticket value is associated with the generation counter of the first job group, the ticket value identifying the finish generation count value at which the first job group is considered finished;
      receiving a first request to steal the first job group;
      determining a state of the first job group based at least in part on the generation counter value, the state indicating that the first job group is available to steal when the generation counter value is two values or more different than the ticket value;
      based on determining the state of the first job group is available for stealing, atomically updating the generation counter value to be one value or more different than the ticket value, thereby making the first job group unavailable for stealing;

based on atomically updating the generation counter value, altering an execution order of the first job group ahead of at least one other job group in the job group queue; and based on finishing the execution of the first job group by the one or more hardware processors, updating the generation counter value to be the same as the ticket value.

2. The job scheduler system of claim 1, wherein the first job group includes a first job list identifying a first plurality of jobs, wherein said altering further includes sending the first plurality of jobs to the execution stack, the one or more hardware processors are configured to execute jobs from the execution stack.

3. The job scheduler system of claim 2, wherein sending the first plurality of jobs to the execution stack further includes removing the first plurality of jobs from the first job group, thereby making the first job list empty, wherein the job scheduler engine is further configured to perform operations comprising:

receiving a second request to steal the first job group approximately contemporaneously with the first request;

based on receiving the second request, determining a state of the first job group based at least in part on the generation counter value, the state indicating that the first job group is available to steal; and failing to steal the first job group for the second request based on the first job list being empty.

4. The job scheduler system of claim 1, wherein the first job group is dependent upon a second job group, wherein the first job group includes a first job list and the second job group includes a second job list, wherein the job scheduler engine is further configured to perform operations comprising:

determining that the first job group is dependent upon the second job group; and based on the determining that the first job group is dependent upon the second job group:

adding the first job list to the end of the second job list; and initiating a steal operation for the second job group.

5. The job scheduler system of claim 1, wherein the first job group occupies a first region in the memory, wherein the first job group includes a first job list, wherein the job scheduler engine is further configured to perform operations comprising:

sending the first job list to the execution stack;

deleting the contents of the first job group; and reusing the first job group for another job group without deallocating the first region in the memory.

6. The job scheduler system of claim 1, wherein the job scheduler engine is further configured to perform operations comprising:

determining that the first job group has been executed; and based on the determining that the first job group has been executed, atomically updating the generation counter value.

7. The job scheduler system of claim 1, wherein processing the first request to steal the first job group does not use a waiting lock on the job group queue.

8. A computer-implemented method comprising:

creating a first job group in a job group queue for an application submitting the first job group to be executed, the job group queue is stored in a memory, the job group queue includes a plurality of job groups in the memory, each job group of the plurality of job groups includes one or more jobs for execution by the one or more hardware processors, and each job group includes an associated generation counter that is used, at least in part, to track a state of the associated job group, wherein the state identifies when the job group has been dequeued or stolen and the job group is in one of three places: (i) on an execution stack, (ii) waiting to get on the execution stack, (iii) being executed, the first job group includes a generation counter identifying one or more of an initial generation count value when the job group is considered available to steal and a finish generation count value when the first job group is considered finished;

transmitting a ticket associated with the first job group to the application, the ticket includes a ticket value for the first job group, the ticket value is associated with the generation counter of the first job group, the ticket value identifying the finish generation count value at which the first job group is considered finished;

receiving a first request to steal the first job group;

determining a state of the first job group based at least in part on the generation counter value, the state indicating that the first job group is available to steal when the generation counter value is two values or more different than the ticket value;

based on determining the state of the first job group is available for stealing, atomically updating the generation counter value to be one value or more different than the ticket value, thereby making the first job group unavailable for stealing;

based on atomically updating the generation counter value, altering an execution order of the first job group ahead of at least one other job group in the job group queue; and based on finishing the execution of the first job group by the one or more hardware processors, updating the generation counter value to be the same as the ticket value.

9. The method of claim 8, wherein the first job group includes a first job list, wherein altering further includes sending the first job list to the execution stack, the one or more hardware processors are configured to execute jobs from the execution stack.

10. The method of claim 9, wherein sending the first plurality of jobs to the execution stack further includes removing the first plurality of jobs from the first job group, thereby making the first job list empty, the method further comprising:

receiving a second request to steal the first job group approximately contemporaneously with the first request;

based on receiving the second request, determining a state of the first job group based at least in part on the generation counter value, the state indicating that the first job group is available to steal; and failing to steal the first job group for the second request based on the first job list being empty.

11. The method of claim 8, wherein the first job group is dependent upon a second job group, wherein the first job group includes a first job list and the second job group includes a second job list, the method further comprising:

determining that the first job group is dependent upon the second job group; and based on the determining that the first job group is dependent upon the second job group:
adding the first job list to the end of the second job list; and
initiating a steal operation for the second job group.

12. The method of claim 8, wherein the first job group occupies a first region in the memory, wherein the first job group includes a first job list, the method further comprising:
sending the first job list to the execution stack;
deleting the contents of the first job group; and
reusing the first job group for another job group without deallocating the first region in the memory.

13. The method of claim 8, further comprising:
determining that the first job group has been executed; and
based on the determining that the first job group has been executed, atomically updating the generation counter value.

14. The method of claim 8, wherein processing the first request to steal the first job group does not use a waiting lock on the job group queue.

15. A non-transitory machine-readable medium storing processor-executable instructions which, when executed by a processor, cause the processor to perform operations comprising:
creating a first job group in a job group queue for an application submitting the first job group to be executed, the job group queue is stored in a memory, the job group queue includes a plurality of job groups in the memory, each job group of the plurality of job groups identifies one or more jobs for execution by the one or more hardware processors, and each job group includes an associated generation counter that is used, at least in part, to track a state of the associated job group, wherein the state identifies when the job group has been dequeued or stolen and the job group is in one of three places: (i) on an execution stack, (ii) waiting to get on the execution stack, (iii) being executed, the first job group includes a generation counter identifying one or more of an initial generation count value when the job group is considered available to steal and a finish generation count value when the first job group is considered finished;
transmitting a ticket associated with the first job group to the application, the ticket includes a ticket value for the first job group, the ticket value is associated with the generation counter of the first job group, the ticket value identifying the finish generation count value at which the first job group is considered finished;
receiving a first request to steal the first job group;
determining a state of the first job group based at least in part on the generation counter value, the state indicating that the first job group is available to steal when the generation counter value is two values or more different than the ticket value;

based on determining the state of the first job group is available for stealing, atomically updating the generation counter value to be one value or more different than the ticket value, thereby making the first job group unavailable for stealing;
based on atomically updating the generation counter value, altering an execution order of the first job group ahead of at least one other job group in the job group queue; and
based on finishing the execution of the first job group by the one or more hardware processors, updating the generation counter value to be the same as the ticket value.

16. The machine-readable medium of claim 15, wherein the first job group includes a first job list, wherein altering further includes sending the first job list to the execution stack, the one or more hardware processors are configured to execute jobs from the execution stack.

17. The machine-readable medium of claim 15, wherein the first job group is dependent upon a second job group, wherein the first job group includes a first job list and the second job group includes a second job list, wherein the processor-executable instructions further cause the processor to perform operations comprising:
determining that the first job group is dependent upon the second job group; and
based on the determining that the first job group is dependent upon the second job group:
adding the first job list to the end of the second job list; and
initiating a steal operation for the second job group.

18. The machine-readable medium of claim 15, wherein the first job group occupies a first region in the memory, wherein the first job group includes a first job list, wherein the processor-executable instructions further cause the processor to perform operations comprising:
sending the first job list to the execution stack;
deleting the contents of the first job group; and
reusing the first job group for another job group without deallocating the first region in the memory.

19. The machine-readable medium of claim 15, wherein the processor-executable instructions further cause the processor to perform operations comprising:
determining that the first job group has been executed; and
based on the determining that the first job group has been executed, atomically updating the generation counter value.

20. The machine-readable medium of claim 15, wherein processing the first request to steal the first job group does not use a waiting lock on the job group queue.

* * * * *